United States Patent
Franklin et al.

(10) Patent No.: US 9,487,877 B2
(45) Date of Patent: *Nov. 8, 2016

(54) CONTACT METALLIZATION OF CARBON NANOTUBES

(75) Inventors: Aaron D. Franklin, Lafayette, IN (US); Matthew R. Maschmann, Chandler, AZ (US); Timothy S. Fisher, West Lafayette, IN (US); Timothy D. Sands, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 1523 days.

This patent is subject to a terminal disclaimer.

(21) Appl. No.: 12/024,635

(22) Filed: Feb. 1, 2008

(65) Prior Publication Data

US 2008/0241755 A1  Oct. 2, 2008

Related U.S. Application Data

(60) Provisional application No. 60/887,695, filed on Feb. 1, 2007.

(51) Int. Cl.
  *C25D 5/02* (2006.01)
  *C25D 11/04* (2006.01)
  (Continued)

(52) U.S. Cl.
  CPC ............... *C25D 7/00* (2013.01); *B82Y 10/00* (2013.01); *B82Y 30/00* (2013.01); *B82Y 40/00* (2013.01); *C01B 31/0233* (2013.01);
  (Continued)

(58) Field of Classification Search
  CPC .... C25D 5/02; C25D 11/045; C01B 31/0253

USPC .......................................... 205/131, 173, 174
  See application file for complete search history.

(56) References Cited

U.S. PATENT DOCUMENTS 4,851,195 A  7/1989 Matthews et al.
4,935,345 A  6/1990 Guilbeau et al.
(Continued)

FOREIGN PATENT DOCUMENTS

WO  03052181  6/2003
WO  03091486 A1  11/2003
(Continued)

OTHER PUBLICATIONS

Maschmann et al., "Vertical single- and double-walled carbon nanotubes grown from modified porous anodic alumina templates," Nanotechnology 17 (2006), pp. 3925-3929.
(Continued)

*Primary Examiner* — Nicholas A Smith
(74) *Attorney, Agent, or Firm* — Purdue Research Foundation

(57) ABSTRACT

In one embodiment, SWNTs are synthesized from an embedded catalyst in a modified porous anodic alumina (PAA) template. Pd is electrodeposited into the template to form nanowires that grow from an underlying conductive layer beneath the PAA and extend to the initiation sites of the SWNTs within each pore. Individual vertical channels of SWNTs are created, each with a vertical Pd nanowire back contact. Further Pd deposition results in annular Pd nanoparticles that form on portions of SWNTs extending onto the PAA surface. Two-terminal electrical characteristics produce linear I-V relationships, indicating ohmic contact in the devices.

15 Claims, 25 Drawing Sheets

(51) Int. Cl.

| | | |
|---|---|---|
| *C01B 31/02* | (2006.01) | |
| *C25D 7/00* | (2006.01) | |
| *B82Y 10/00* | (2011.01) | |
| *B82Y 30/00* | (2011.01) | |
| *B82Y 40/00* | (2011.01) | |
| *C25D 5/18* | (2006.01) | |

(52) U.S. Cl.
CPC ............ *C01B 31/0253* (2013.01); *C25D 5/02* (2013.01); *C25D 5/18* (2013.01); *C25D 11/045* (2013.01); *C01B 2202/02* (2013.01); *C01B 2202/08* (2013.01)

(56) References Cited

U.S. PATENT DOCUMENTS

| | | | |
|---|---|---|---|
| 4,968,389 A * | 11/1990 | Satoh et al. | 205/106 |
| 5,246,859 A | 9/1993 | Nelson et al. | |
| 5,382,417 A | 1/1995 | Haase | |
| 5,993,694 A | 11/1999 | Ito et al. | |
| 6,232,706 B1 | 5/2001 | Dai et al. | |
| 6,359,288 B1 | 3/2002 | Ying et al. | |
| 6,566,704 B2 | 5/2003 | Choi et al. | |
| 7,037,767 B2 | 5/2006 | Hirai | |
| 7,084,002 B2 | 8/2006 | Kim et al. | |
| 7,235,159 B2 | 6/2007 | Gu et al. | |
| 7,345,296 B2 | 3/2008 | Tombler, Jr. et al. | |
| 7,371,674 B2 | 5/2008 | Suh et al. | |
| 7,538,062 B1 | 5/2009 | Dai et al. | |
| 7,576,410 B2 | 8/2009 | Rueb et al. | |
| 7,608,905 B2 | 10/2009 | Bratkovski et al. | |
| 7,615,492 B2 | 11/2009 | Yang et al. | |
| 2002/0117659 A1 | 8/2002 | Lieber et al. | |
| 2003/0041438 A1 | 3/2003 | Wei et al. | |
| 2003/0113713 A1 | 6/2003 | Glezer et al. | |
| 2003/0134433 A1 | 7/2003 | Gabriel et al. | |
| 2003/0143398 A1 | 7/2003 | Ohki et al. | |
| 2003/0218224 A1 | 11/2003 | Schlaf et al. | |
| 2004/0018587 A1 | 1/2004 | Makowski et al. | |
| 2004/0023428 A1 | 2/2004 | Gole et al. | |
| 2004/0065970 A1 | 4/2004 | Blanchet-Fincher | |
| 2004/0091285 A1 | 5/2004 | Lewis | |
| 2004/0120183 A1 | 6/2004 | Appenzeller et al. | |
| 2004/0124504 A1 | 7/2004 | Hsu | |
| 2004/0149979 A1 | 8/2004 | Cheong et al. | |
| 2004/0158410 A1 | 8/2004 | Ono et al. | |
| 2005/0112049 A1 | 5/2005 | Hofmeister | |
| 2005/0248256 A1 | 11/2005 | Song et al. | |
| 2005/0249980 A1 | 11/2005 | Itoh et al. | |
| 2005/0255313 A1 | 11/2005 | Kyotani et al. | |
| 2005/0255581 A1 | 11/2005 | Kim et al. | |
| 2006/0004271 A1 | 1/2006 | Peyser et al. | |
| 2006/0128808 A1 | 6/2006 | Graham et al. | |
| 2006/0177952 A1 | 8/2006 | Lambertini et al. | |
| 2006/0208362 A1* | 9/2006 | Dubin | 257/762 |
| 2006/0231946 A1 | 10/2006 | Pan et al. | |
| 2006/0240238 A1 | 10/2006 | Boussaad et al. | |
| 2006/0244361 A1 | 11/2006 | Kim et al. | |
| 2006/0270229 A1 | 11/2006 | Corderman et al. | |
| 2006/0281306 A1 | 12/2006 | Gstrein et al. | |
| 2007/0042377 A1 | 2/2007 | Gao et al. | |
| 2007/0275499 A1 | 11/2007 | Corderman et al. | |
| 2009/0084678 A1 | 4/2009 | Joshi et al. | |
| 2009/0183816 A1 | 7/2009 | Min et al. | |
| 2009/0297913 A1 | 12/2009 | Zhang et al. | |
| 2010/0009134 A1 | 1/2010 | Drndic et al. | |

FOREIGN PATENT DOCUMENTS

| | | |
|---|---|---|
| WO | 2004029176 A1 | 4/2004 |
| WO | 2004035462 A2 | 4/2004 |
| WO | 2004087564 A1 | 10/2004 |
| WO | 2005093872 A1 | 10/2005 |
| WO | 2006031981 | 3/2006 |
| WO | 2006060054 A1 | 6/2006 |
| WO | 2006135253 A1 | 12/2006 |
| WO | 2007089550 A2 | 8/2007 |
| WO | 2008024674 | 2/2008 |
| WO | 2008127293 A2 | 10/2008 |
| WO | 2008129524 | 10/2008 |
| WO | 2009036071 A1 | 3/2009 |
| WO | 2009073927 A1 | 6/2009 |
| WO | 2009097357 A1 | 8/2009 |

OTHER PUBLICATIONS

Franklin et al., "In-place fabrication of nanowire electrode arrays for vertical nanoelectronics on Si substrates," J. Vac. Sci. Technol. B25(2), Mar./Apr. 2007, pp. 343-347.

Maschmann et al., "Lithography-Free in Situ Pd Contacts to Templated Single-Walled Carbon Nanotubes," Nano Letters (2006), vol. 6, No. 12, pp. 2712-2717.

Ou et al., "Multisegmented on-dimensional hybrid structures of carbon nanotubes and metal nanowires," Applied Physics Letters 89, 243122 (2006), 4 pages.

Che et al., "Chemical Vapor Deposition Based Synthesis of Carbon Nanotubes and Nanofibers Using a Template Method." Chem. Mater., vol. 10, No. 1 (1998), pp. 260-267.

Kamins et al., "Growth and Structure of Chemically Vapor Deposited Ge Nanowires on Si Substrates," Nano Lett., vol. 4, No. 3 (2004), pp. 503-506.

Kikkawa et al., "Growth rate of silicon nanowires," Appl. Phys. Lett. 86, 123109, (2005), pp. 1-3.

Li et al., "Highly-ordered carbon nanotube arrays for electronics applications," Appl. Phys. Lett., vol. 75, No. 3, (1999), pp. 367-369.

Maschmann et al., "Parametric study of synthesis conditions in plasma-enhanced CVD of high-quality single-walled carbon nanotubes," Carbon, vol. 44 (2006) pp. 10-18.

Masuda et al., Fabrication of Gold Nanodot Array Using Anodic Porous Alumina as an Evaporation Mask, Jpn. J. Appl. Phys., vol. 35 (1996), pp. L126-L129.

Persson et al., "Solid-phase diffusion mechanism for GaAs nonwire growth," Nature Materials, vol. 3, (2004), pp. 577-581.

McIamore, E.S. et al. "A Self-Referencing Glutamate Biosensor for Measuring Real Time Neuronal Glutamate Flux" Journal of Neuroscience Methods. 2010, 189, pp. 14-22.

Dale, N; Hatz, S; Tian, F; and Llaudet, E "Listening to the Brain: Microelectrode Biosensors for Neurochemicals" Trends in Biotechnology, Aug. 2005, 23(8), pp. 420-428.

Bharathi, S and Nogami, M "A glucose biosensor based on electrodeposited biocomposites of gold nanoparticles and glucose oxidase enzyme" Analyst, 2001, 126(11), pp. 1919-1922.

U.S. Appl. No. 11/474,680, NF OA mailed Mar. 4, 2011, 7 pages.
Applicant Response, U.S. Appl. No. 11/747,680, filed Sep. 1, 2011, 25 pages.
U.S. Appl. No. 11/747,680, NF OA mailed Jan. 12, 2012 10 pages.
Applicant Response, U.S. Appl. No. 11/747,680, filed May 11, 2012, 26 pages.
U.S. Appl. No. 11/747,680, FR OA mailed Sep. 5, 2012, 13 pages.
U.S. Appl. No. 12/025,453, NF OA mailed Oct. 4, 2011, 10 pages.
Applicant Response, U.S. Appl. No. 12/025,453, filed Mar. 5, 2012, 15 pages.
U.S. Appl. No. 12/025,453, FR OA mailed Mar. 16, 2012, 10 pages.
U.S. Appl. No. 12/694,876, NF OA mailed Dec. 20, 2012, 13 pages.
U.S. Appl. No. 12/755,188, NF OA mailed Feb. 15, 2013, 10 pages.

* cited by examiner

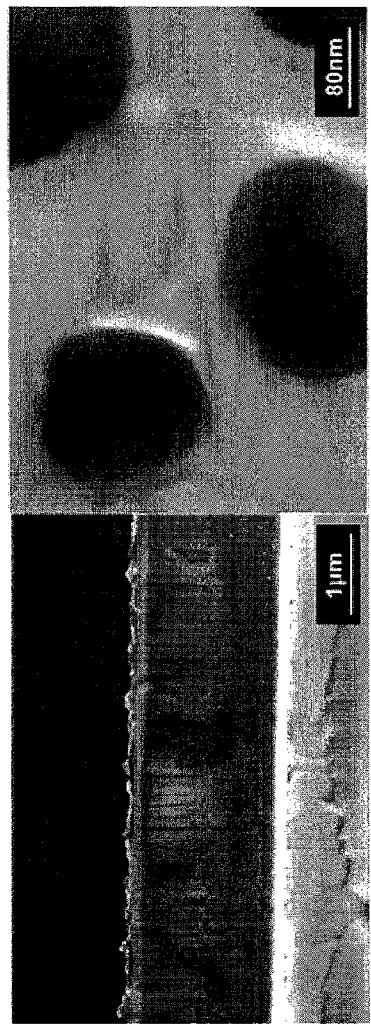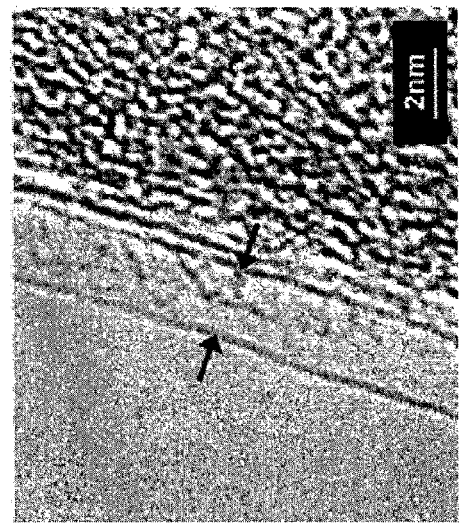

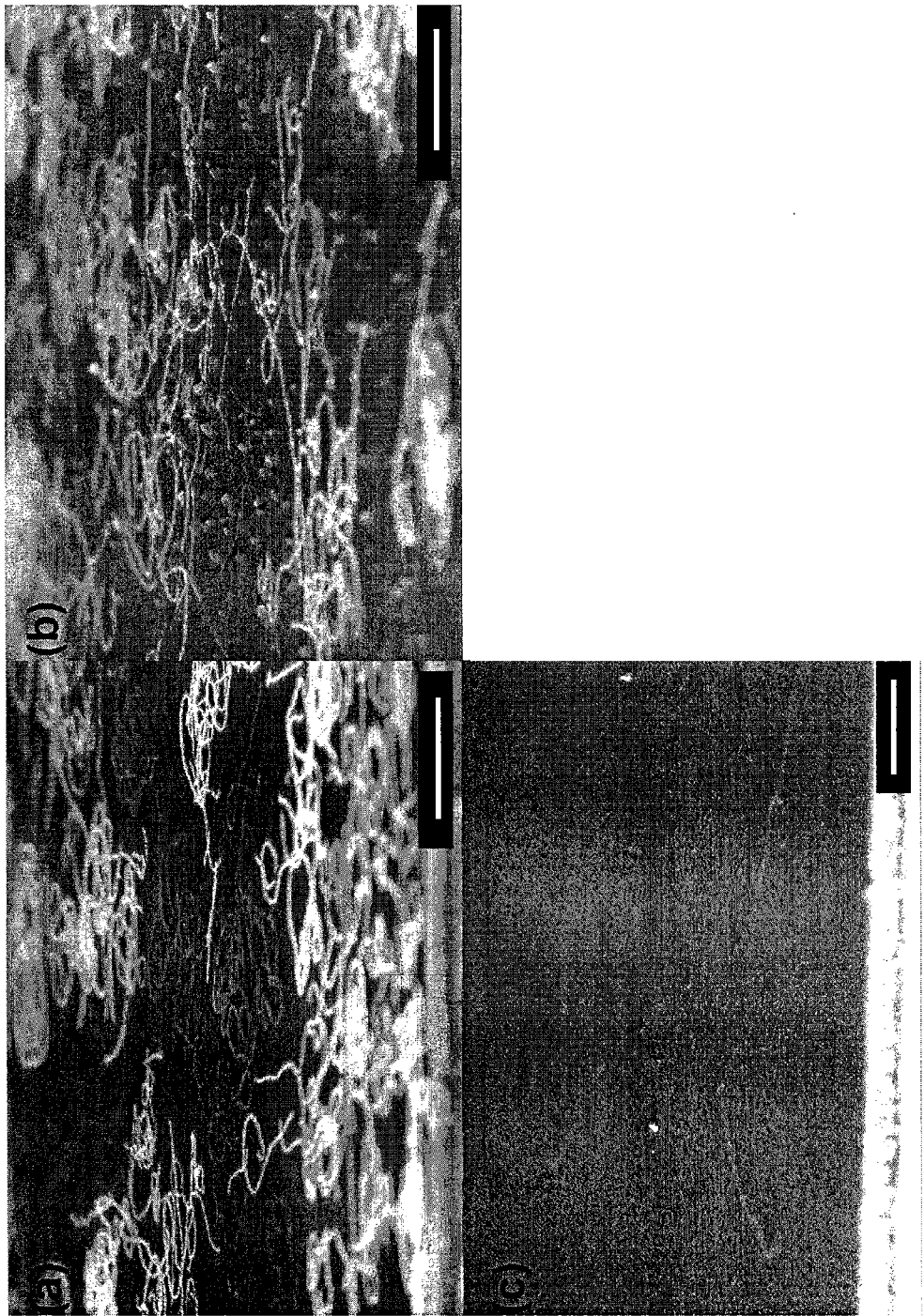
FIG. 5.1

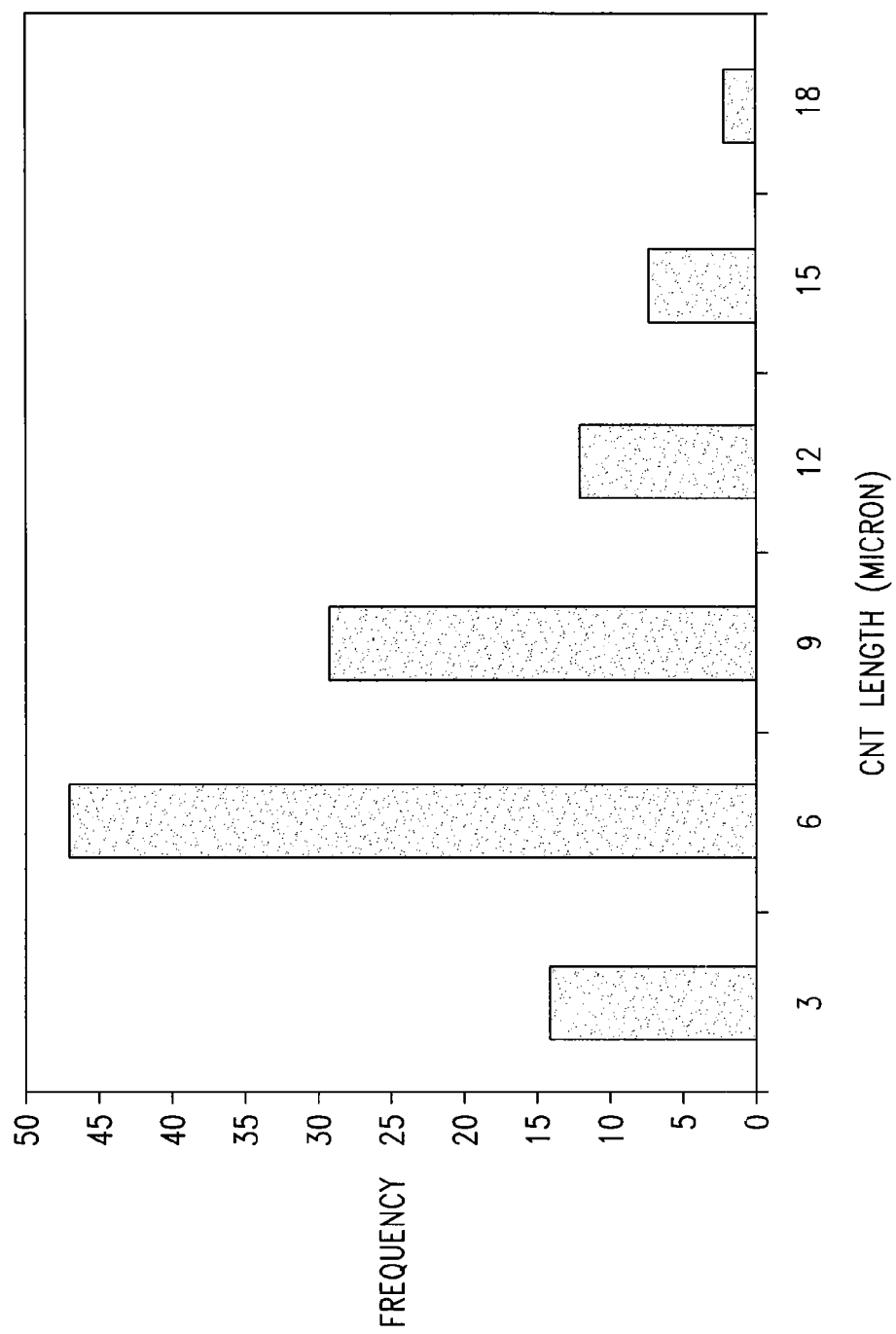
Fig. 5.1D

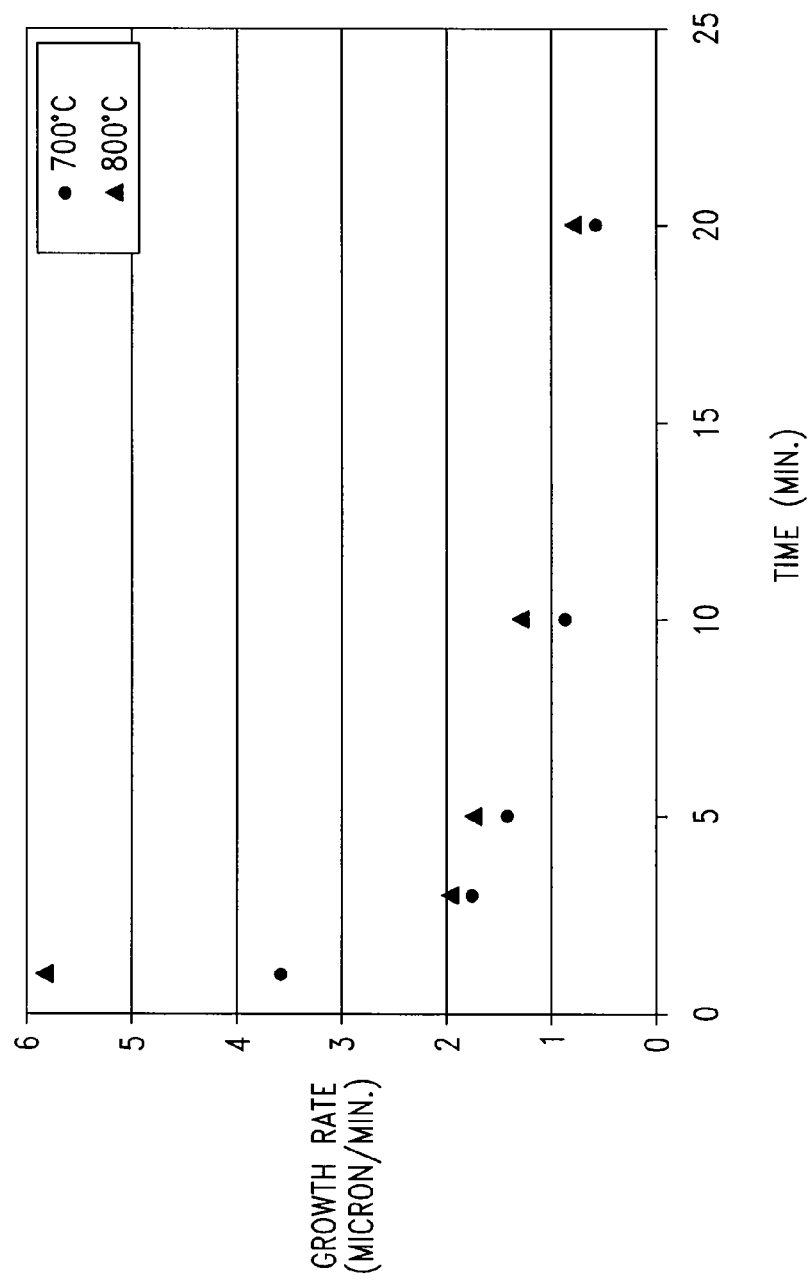
Fig. 5.2A

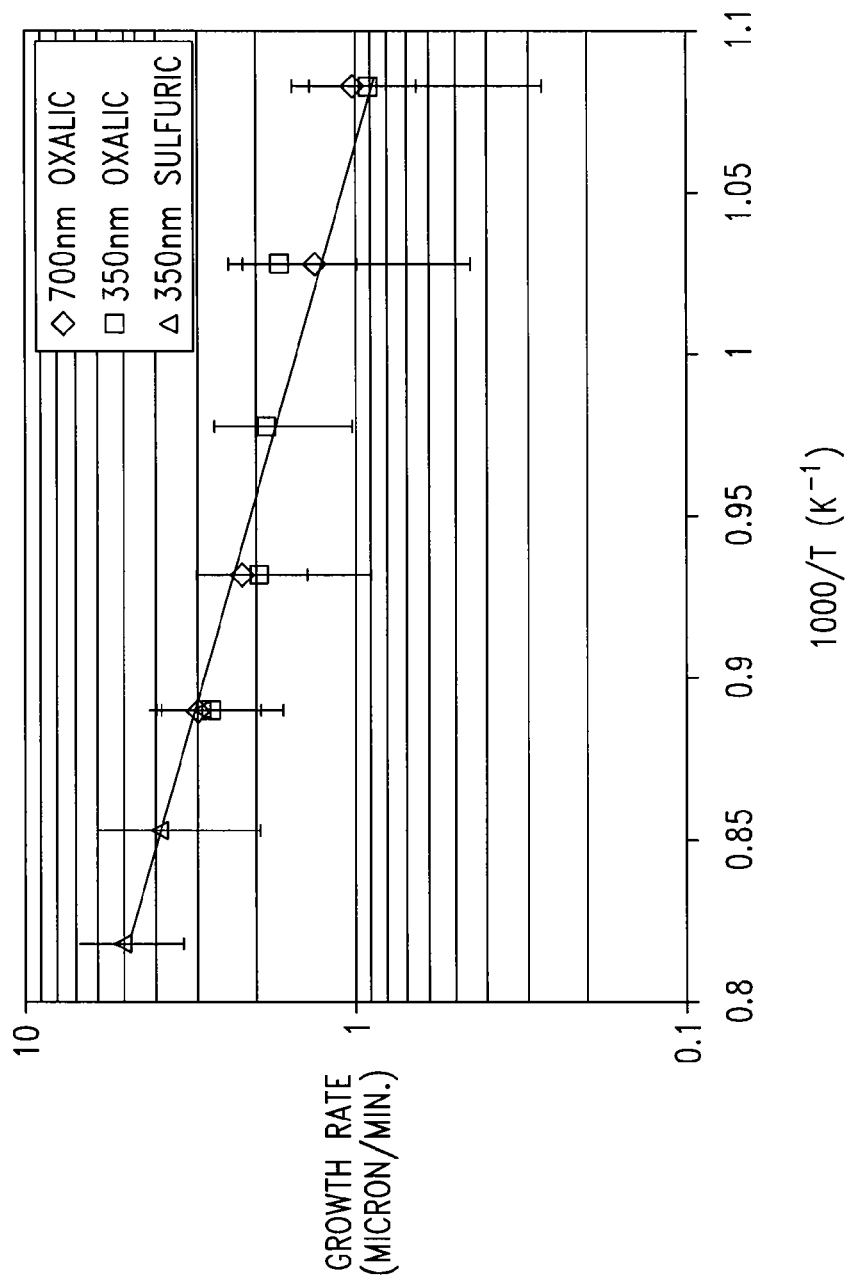
Fig. 5.2B

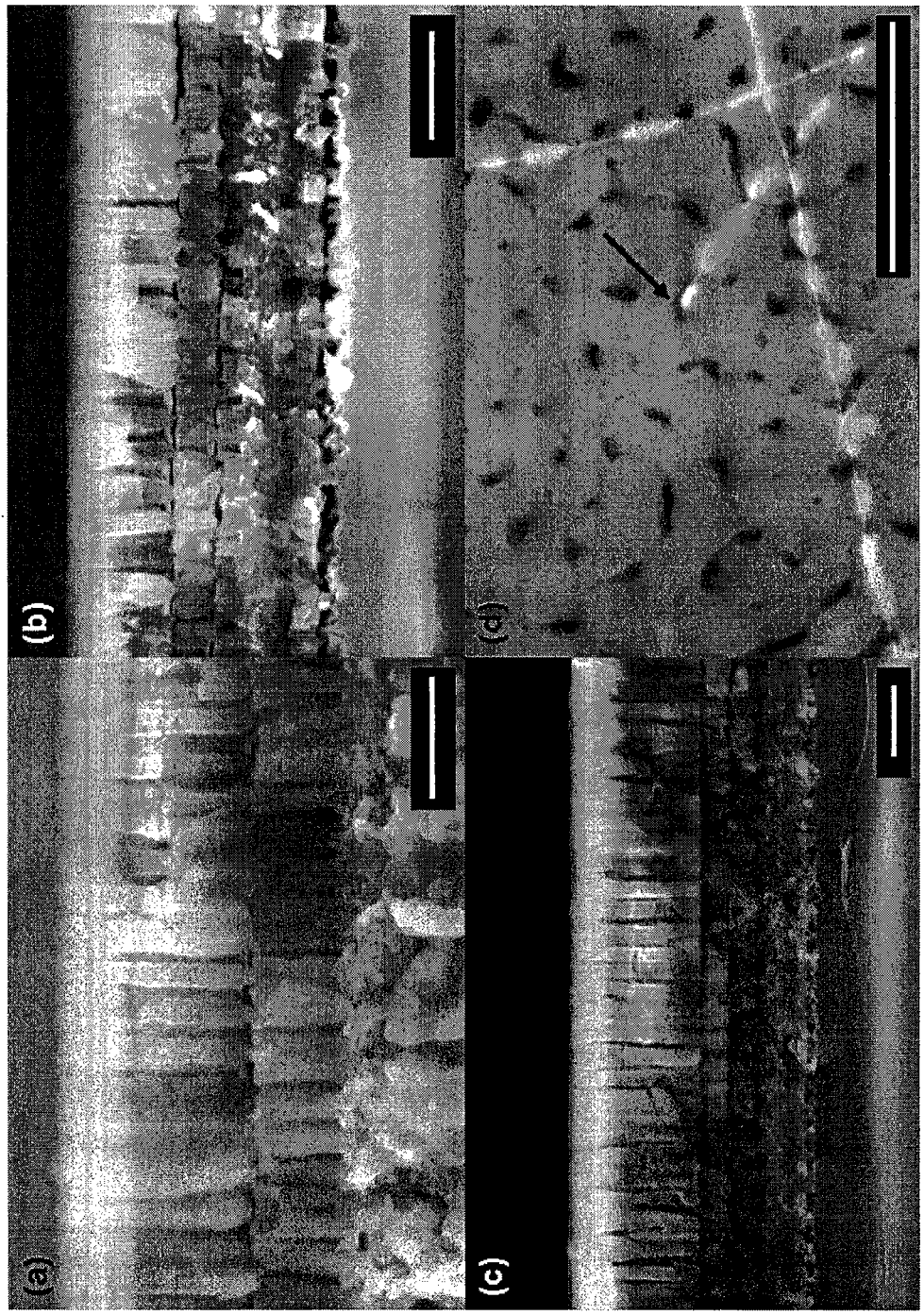
FIG. 5.3

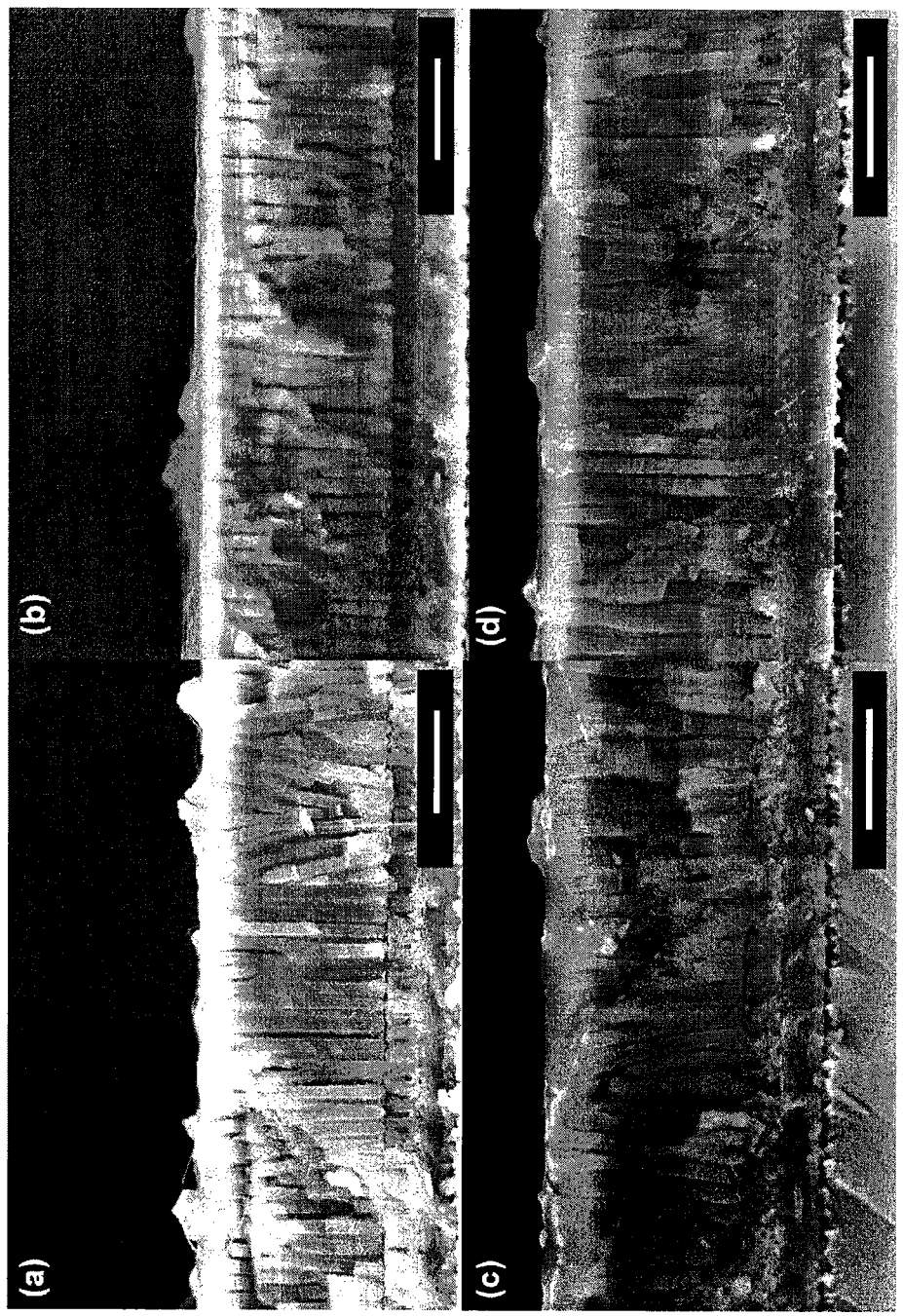
FIG. 5.4

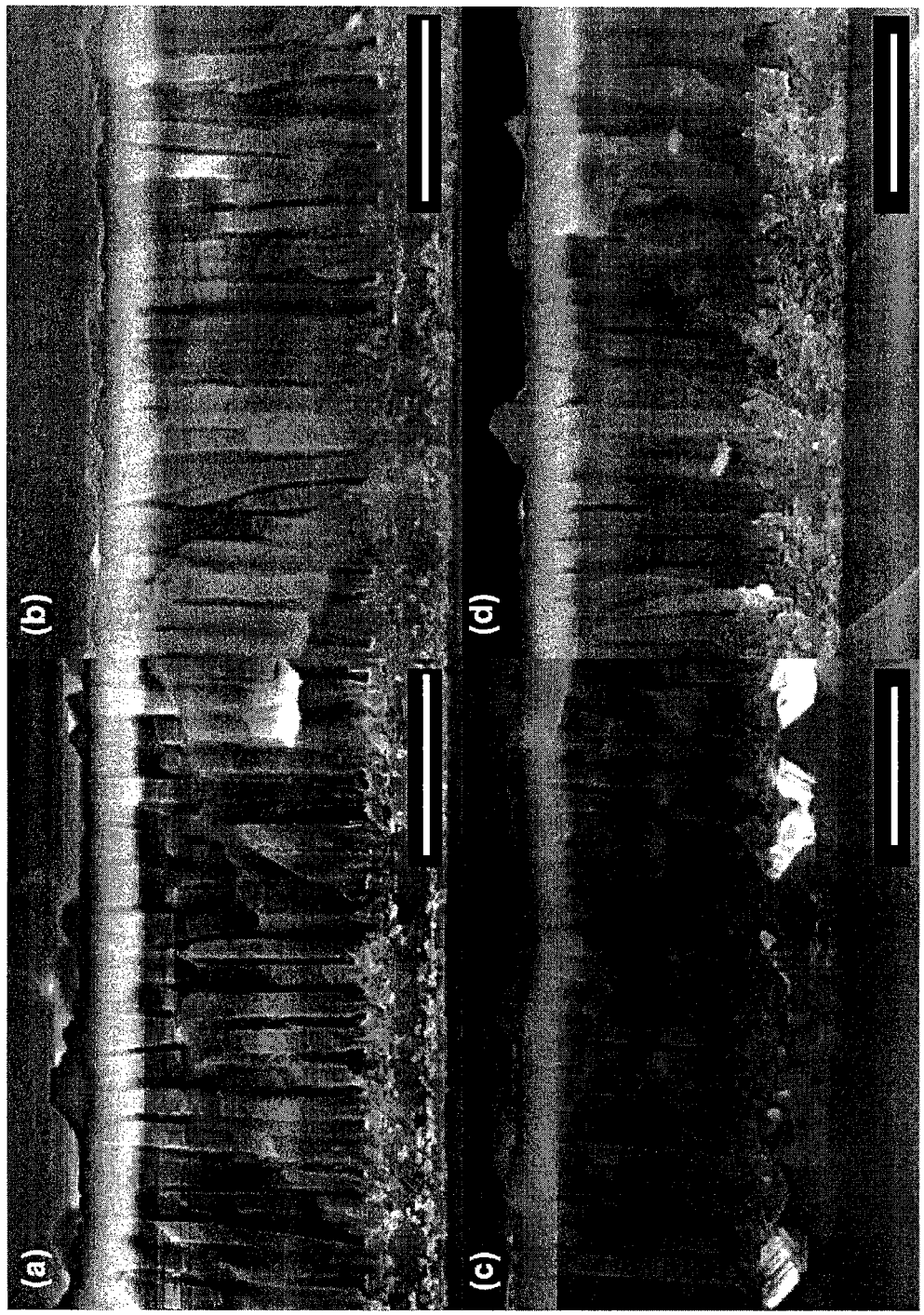
FIG. 5.5

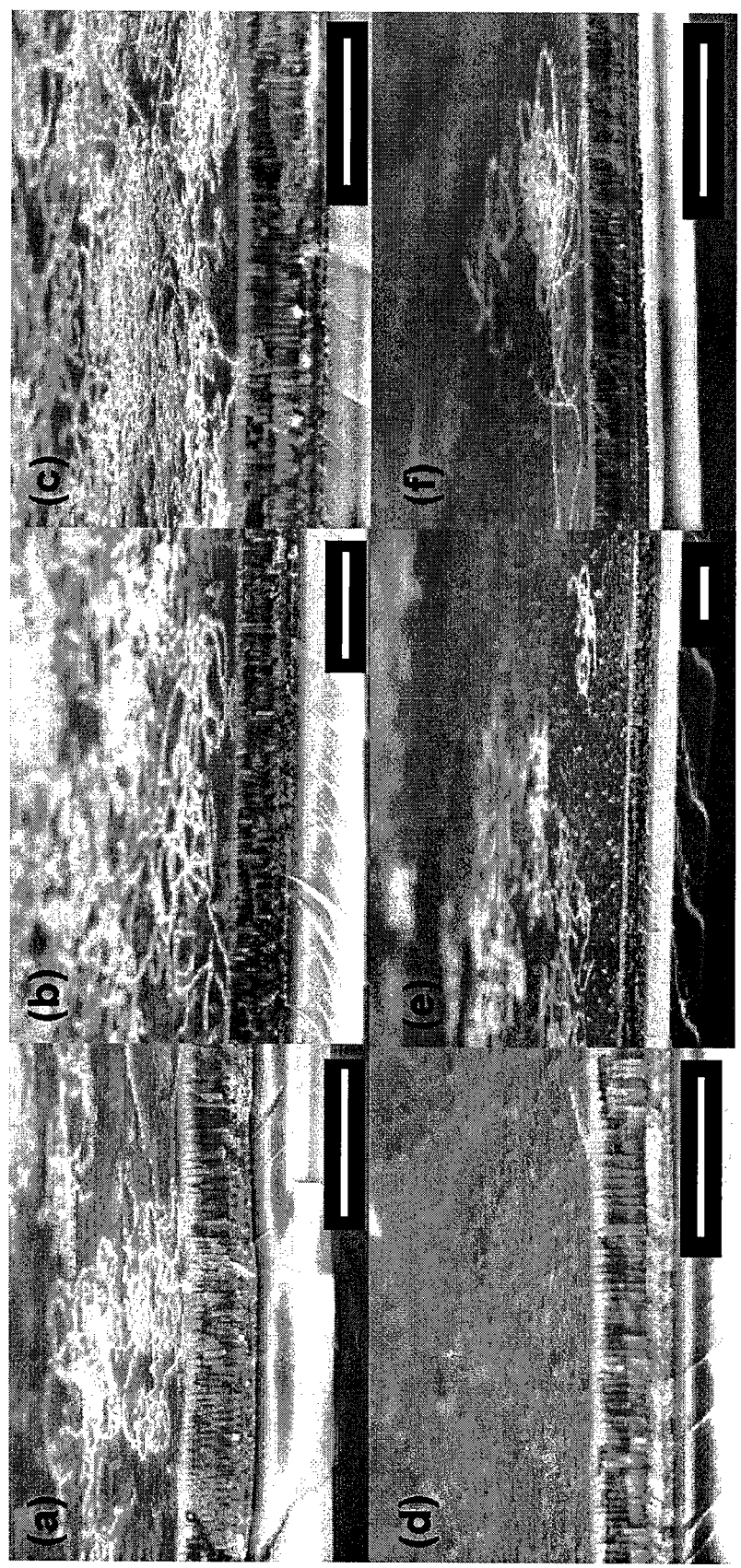
FIG. 5.6

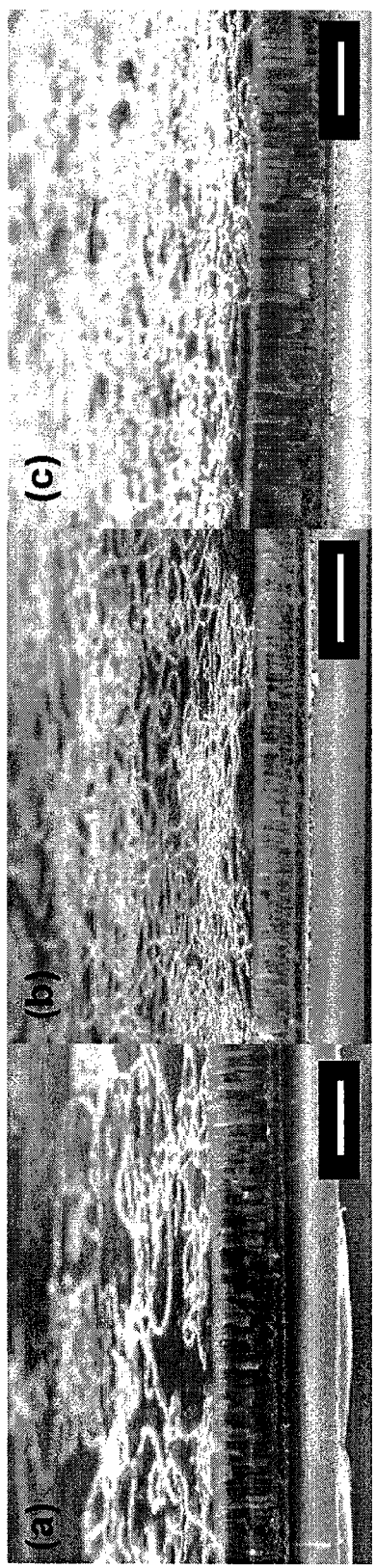
FIG. 5.7
FIG. 6.4

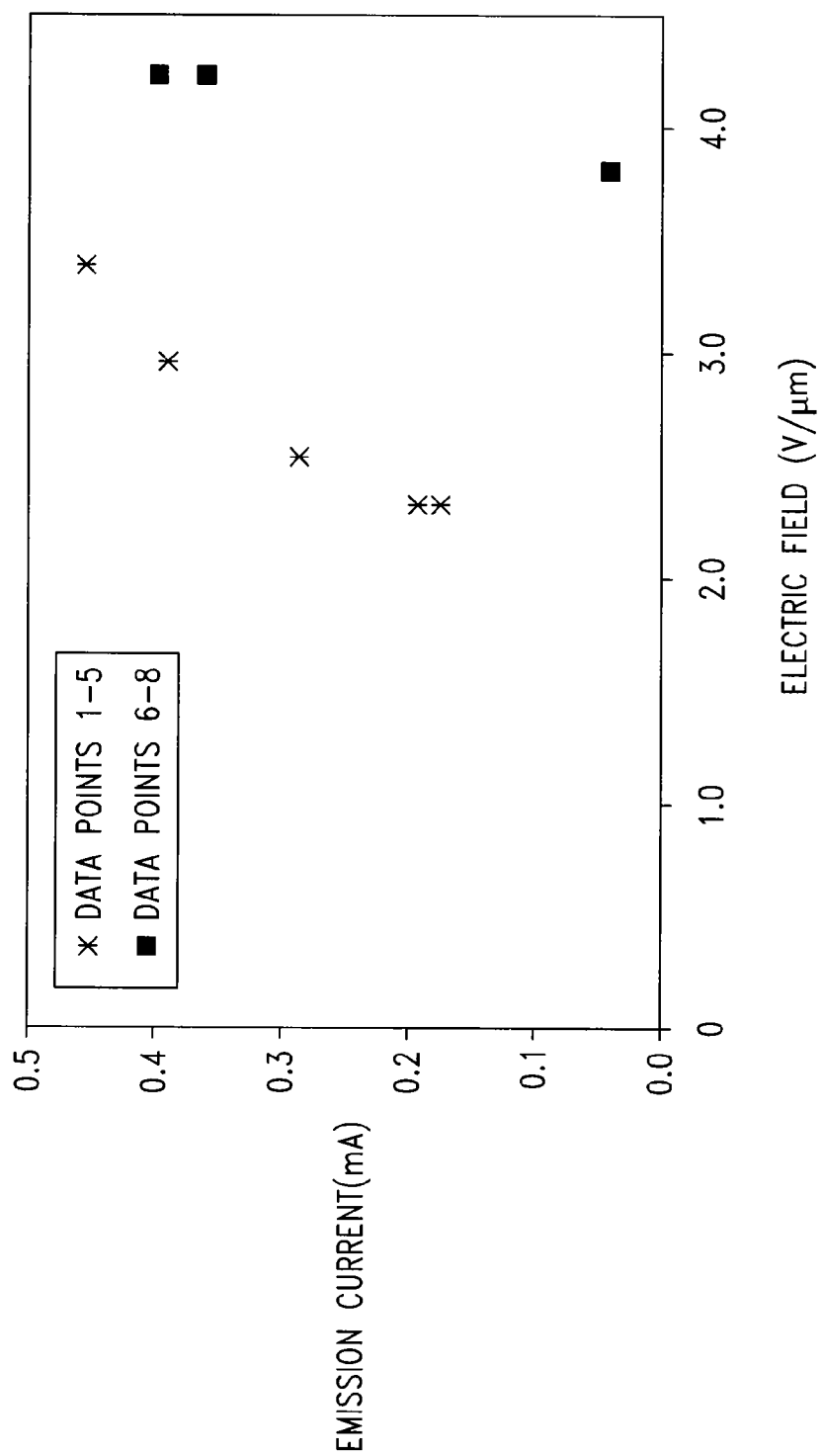
Fig. 7.1A

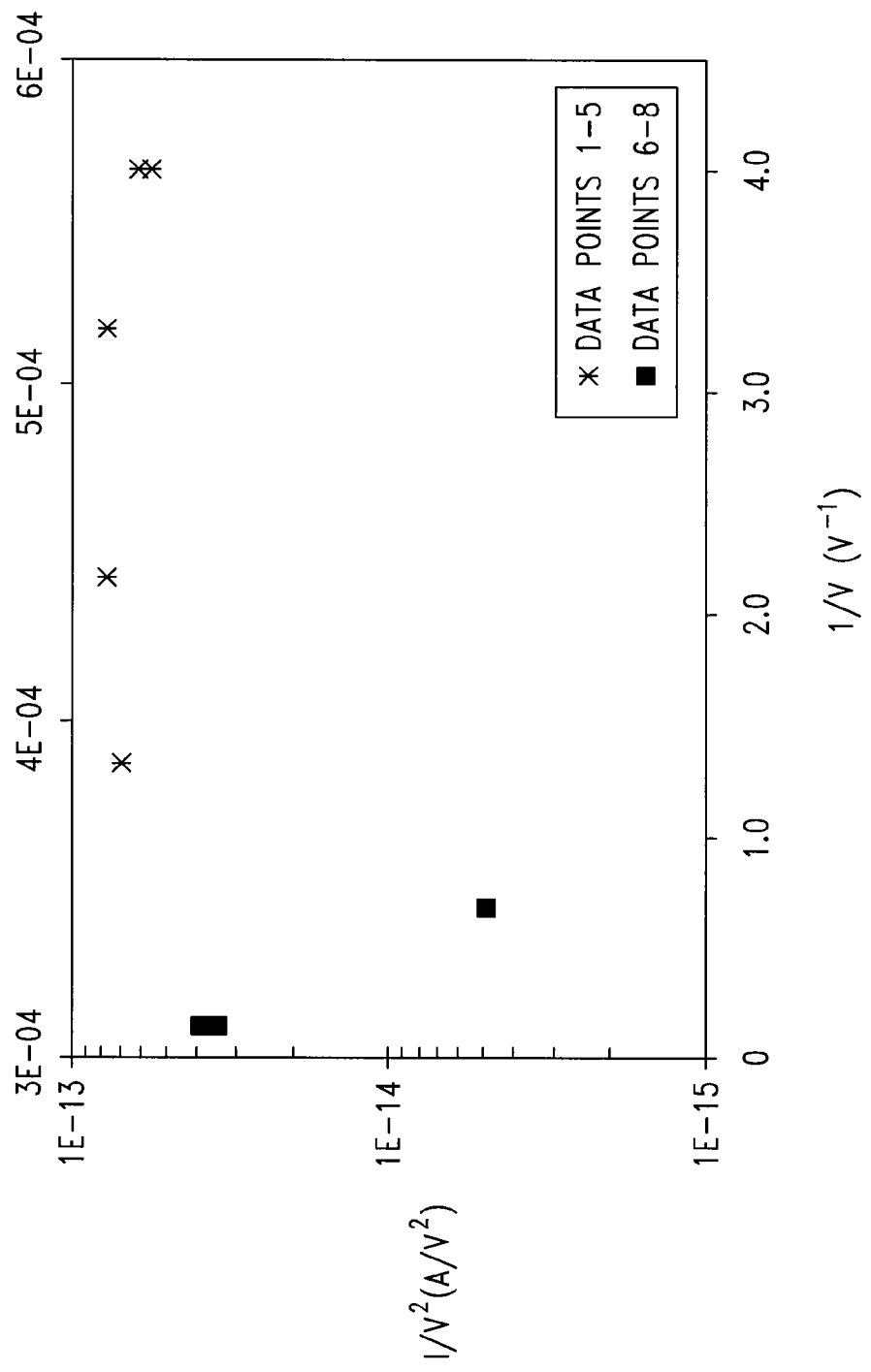
Fig. 7.1B

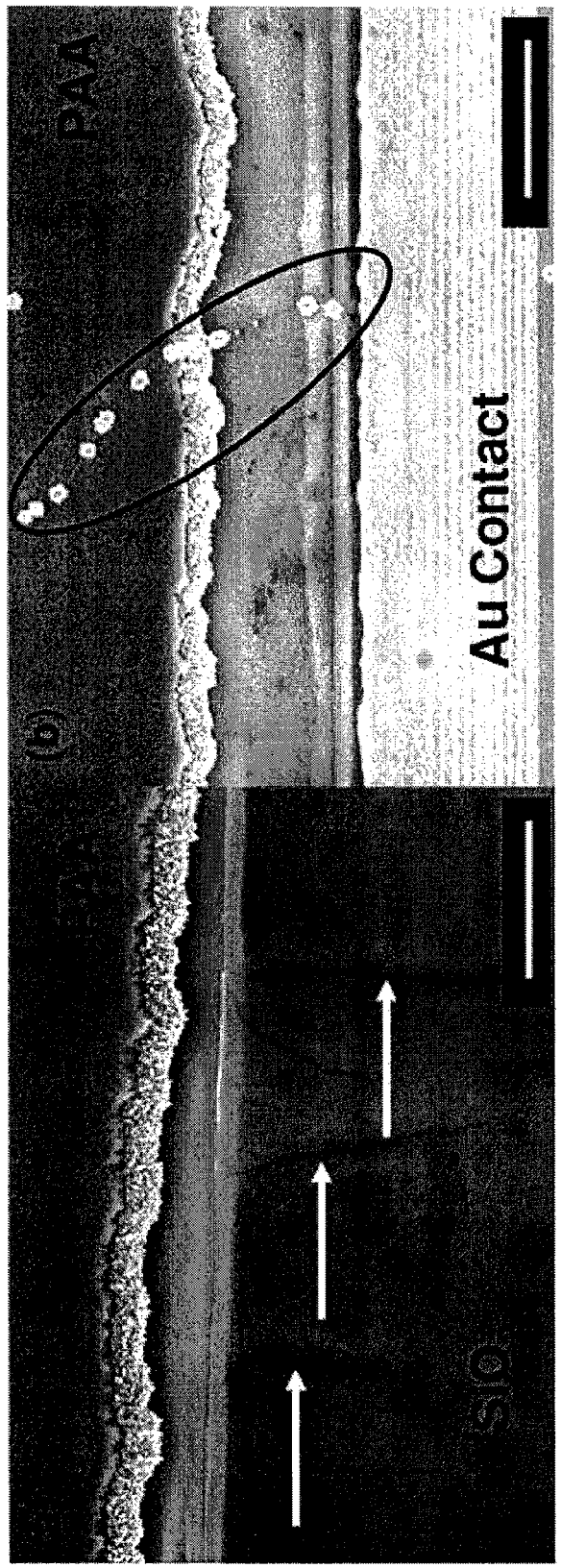
FIG. 7.2

CONTACT METALLIZATION OF CARBON NANOTUBES

CROSS REFERENCE TO RELATED APPLICATIONS

This application claims the benefit of priority to U.S. provisional patent application Ser. No. 60/887,695, filed Feb. 1, 2007, all of which is incorporated herein by reference.

FIELD OF THE INVENTION

These inventions pertain to methods and apparatus for metallizing nanotubes, and in particular to metallization of single-walled carbon nanotubes (SWNTs).

BACKGROUND OF THE INVENTION

Although new concepts for complex vertical carbon nanotube devices have been proposed in recent years, the means to establish individual electrical contacts and structural support to vertical SWNTs have not been demonstrated. In part, the inability to synthesize vertical SWNTs in pre-defined locations has hindered advancement of the topic. Various embodiments of the invention include both a robust process to synthesize SWNTs reproducibly in vertical, long-range ordered channels suitable for device integration and a facile means to contact the top and bottom of SWNTs simultaneously without the use of any lithographic procedures. Additionally, the process allows individual SWNTs to be annularly contacted in situ from their points of origin by metallic nanowires for establishment of electrical contact.

SWNTs have been integrated into numerous electronic and chemical sensing devices to exploit their exceptional electronic transport properties and potential for high-density integration. Current device contact metallization procedures include the direct deposition of lithographically defined metallic contact pads onto a substrate containing SWNTs or the dispersion of SWNTs onto pre-defined contact pads. These procedures generally exhibit low yields and are limited to two-dimensional, planar architectures. Although horizontal structures have proven invaluable for examination of SWNT transport properties and functional material selection, their flexibility is limited and precludes the exploitation of the nanometer-scale diameter of SWNTs as a scaling metric for device integration. A vertical SWNT device would allow for increased integration density and a wrap-around gate geometry, providing excellent control over the channel electrostatics. However, the inability to support and electrically address vertical nanotubes has prevented vertical devices from being realized.

SUMMARY OF THE INVENTION

Various embodiments of the present invention pertain to methods and structures for metallizing a nanotube.

One embodiment pertains to a method of metallizing an array of carbon nanotubes, comprising synthesizing at least one single walled carbon nanotube in each of a plurality of pores; placing the porous template in a solution containing metallic ions after said synthesizing; and electrodepositing a quantity of metal in each of the plurality of pores.

Yet another embodiment pertains to a method of metallizing an array of carbon nanotubes, comprising providing a plurality of nanopores; forming a carbon nanotube in each nanopore, and applying a plurality of electrical pulses to the nanotubes, said pulses being either of a predetermined waveform of current or a predetermined waveform of voltage.

A still further embodiment pertains to a method of metallizing an array of carbon nanotubes, comprising applying a plurality of input electrical pulses to a plurality of carbon nanotubes, measuring the corresponding output pulses; detecting a change in the ratio of input pulse to output pulse during a sequence of pulses; and stopping said applying in response to a detecting predetermined change.

One embodiment pertains to a method of metallizing an array of carbon nanotubes, comprising electrodepositing a nanowire of metal in each of a plurality of pores, each nanowire being in electrical contact with one end of a corresponding nanotube; and electrodepositing a nanoparticle of metal on the other end of at least one of the nanotubes.

Yet another embodiment pertains to a method of metallizing an array of carbon nanotubes, comprising anodizing the template to form porous anodic alumina; removing a portion of alumina in the bottom of a pore; synthesizing at least one carbon nanotube in the pore; and electrodepositing a quantity of the metal in the pore.

Yet another embodiment pertains to a method of metallizing an array of carbon nanotubes, comprising providing a plurality of aligned, generally cylindrical nanopores in an array, forming a carbon nanotube in each nanopore, and removing the portion of the nanotube extending beyond the surface.

Yet another embodiment pertains to producing a nanoporous array by applying to a surface a layer of resist material sensitive to an electron beam, exposing the layer to an electron beam at a plurality of sites in a predetermined pattern; etching the surface under each of the sites to create a corresponding pattern of defects; and creating a pore from each defect by anodizing.

These and other aspects of various inventions will be apparent from the description, drawings, and claims that follow.

DESCRIPTION OF THE DRAWINGS

FIGS. 1-10 includes plots, photographs and schematics according to various embodiments of the present invention.

FIG. 1(*a*): Process flow and products for electrically contacted vertically oriented SWNT arrays. Schematic of (a) film stack prior to anodization, FIG. 1(*b*): SWNTs emerging from PAA pores after undergoing anodization and PECVD synthesis.

FIG. 1(*c*): electrodeposited Pd nanowires contacting the bottom of SWNTs and Pd nanoparticles forming on SWNTs located on the top PAA surface.

FIG. 1(*d*): Angled cross-sectional FESEM images of SWNTs grown from a PAA template prior to electrodeposition of Pd.

FIG. 1(*e*): Cross-sectional FESEM of a SWNT emerging from a Pd nanowire within a pore.

FIG. 1(*f*): Angled cross-sectional FESEM of SWNTs concentrically decorated with uniform Pd nanoparticles.

FIG. 1(*g*): A schematic of porous anodic Al—Fe—Al preparation and CNT synthesis procedure according to one embodiment of the present invention. (a) Initial deposited film structure.

FIG. 1(*h*): The schematic of FIG. 1(*g*) showing anodized film structure FIG. 1(*i*): The schematic of FIG. 1(*g*) showing CNTs synthesized from pore channels.

FIG. 2(a): Cross-sectional FESEM image of SWNTs growth from PAA template consisting of 150 nm Ti/500 nm Al/1 nm Fe/700 nm Al.

FIG. 2(b): Top view of SWNTs on PAA top surface

FIG. 2(c): HRTEM image of a bundle of SWNTs grown from PAA template.

FIGS. 5.1(a)-5.1(d): CNT growth at 850° C. for 3 minutes using porous anodic Al—Fe—Al structures. Tilted FESEM micrographs of (a) 350 nm and (b) 700 nm top alumina layer anodized using oxalic acid and (c) 350 nm top alumina layer anodized using sulfuric acid. (d) Histogram of CNT length for sample with 700 nm top alumina layer anodized using oxalic acid. Scale bar=2 microns.

FIGS. 5.2(a)-5.2(b): CNT growth rate for porous anodic Al—Fe—Al structures. (a) Average growth rate for 350 nm top alumina layer film anodized in oxalic acid at 700 and 800° C. (b) Arrhenius plot of average growth rate for structures after 3 minute synthesis time.

FIGS. 5.3(a)-5.3(d): Effect of multiple Fe layers. Cross-sectional FESEM images of a (a) single, (b) double, and (c) triple 0.5 nm Fe layer. (d) FESEM top view of porous template utilizing triple 0.5 nm Fe layer showing CNT emerging from pore. Scale bar=300 nm.

FIGS. 5.4(a)-5.4(d): Cross-sectional FESEM images showing effect of preanodization thermal diffusion on 2 nm Fe catalyst layer. Diffusion conditions include 450° C. for (a) 20 minutes and (b) 60 minutes and 500° C. for (c) 20 minutes and (d) 60 minutes. Scale bar=500 nm.

FIGS. 5.5(a)-5.5(d): Cross-sectional FESEM images showing effect of preanodization thermal diffusion on 0.5 nm Fe catalyst layer. Diffusion conditions include 450° C. for (a) 20 minutes and (b) 60 minutes and 500° C. for (c) 20 minutes and (d) 60 minutes. Scale bar=500 nm.

FIGS. 5.6(a)-5.6(f): Comparison of CNT density for various Fe layer thicknesses. Cross-sectional FESEM images of samples having undergone pre-anodization 500° C. thermal diffusion for 20 minutes incorporating (a) 0.5 nm, (b) 1.0 nm, and (c) 2.0 nm Fe layers. Cross-sectional FESEM images of samples without pre-anodization thermal diffusion with samples incorporating (d) 0.5 nm, (b) 1.0 nm, and (c) 2.0 nm Fe layers. Scale bar=1 micron.

FIGS. 5.7(a)-5.7(c): Cross-sectional FESEM images showing effect of porous anodic template containing multiple 0.5 nm Fe layers after undergoing 500° C. pre-anodization diffusion for 20 minutes. (a) One Fe layer. (b) Two Fe layers separated by 100 nm Al. (c) Three Fe layers, each separated by 100 nm Al. Scale bar=1 micron.

FIGS. 6.4(a)-6.4(c): Density of nanoparticles forming around SWNTs on top PAA surface. Angled cross-sectional FESEM images of (a) SWNTs grown from a PAA template prior to electrodeposition of Pd, (b) SWNTs concentrically decorated with uniform Pd nanoparticles, and (c) Pd nanoparticle density on SWNTs located on PAA surface.

FIGS. 7.1(a)- 7.1(b): Field emission from CNTs synthesized in porous anodic Al—Fe—Al template. (a) Emission current with applied electric field (gap=762 microns). (b) Fowler Nordheim plot of emission results.

FIGS. 7.2(a)-7.2(b): FESEM images of patterned porous anodic Al—Fe—Al on oxidized Si. (a) CNTs growing from template onto oxidized Si. (b) Pd-decorated CNT growing from template onto oxidized Si and contacted by Au pad.

FIG. 8: A schematic representation of an electrode deposition process according to one embodiment of the present invention.

FIGS. 10(a)-10(c): FESEM images of a hexagonal pattern with 100 nm interpore spacing in (a) PMMA, (b) Al after etching, and (c) PAA (inset shows SWNTs on PAA surface).

DESCRIPTION OF THE PREFERRED EMBODIMENT

Figure 1A:
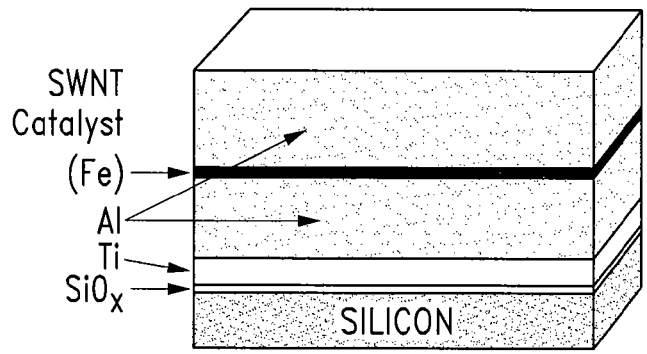
Figure 1B:
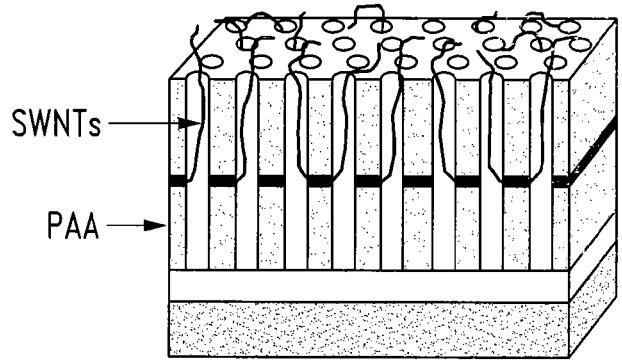
Figure 1C:
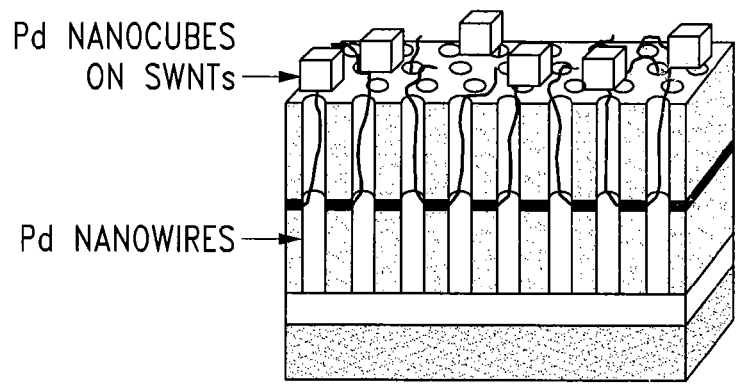

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

This application incorporates by reference U.S. provisional patent application Ser. No. 60/747,422, filed 17 May 2006.

Some embodiments of the present invention provide a procedure for electrically contacting vertical carbon nanotubes with nanoscale metallic wires and/or particles. Current means for establishing electrical contacts with nanotubes involves photolithography or electron-beam lithography to deposit patterned metal pads. The method described in this disclosure uses electrodeposition of metal directly to the base and tip of vertical carbon nanotubes, leading to isolated nanoscale electrical contacts of individual nanotubes. The process is adaptable to address individual carbon nanotubes or networks of nanotubes with a common back contact.

The technology allows for the establishment of top and bottom (source and drain) nanoscale electrical contacts to vertical carbon nanotubes simultaneously without the need for lithography. Further, some embodiments of the present invention include the ability to create nanotube contacts with palladium, which is a preferred metal for contacting nanotubes because of the resulting Ohmic nature of the contact.

The technology allows for the annular deposition of nanoscale carbon nanotube electrical contacts without the need for lithography. This method can be used to metallize nanoscale top contacts to carbon nanotube tips without explicit knowledge of the nanotubes location. Further, the filling process is partially self-limiting, in the sense that once the electrodeposited metal reaches the bottom of the nanotubes, the nature of the electrodeposition process changes such that the deposition within pores ceases or slows.

The technique is currently used for the application of nanoscale electrical contacts to the top and bottom of templated semi-vertical carbon nanotubes. For a vertical and electrically contacted nanotube circuit, either short nanotubes (flush with the top of the alumina template surface) may be synthesized from the template or a mechanical polishing of the top template surface to shear the top excess carbon nanotubes may be used to create nanotubes whose tips are flush with the top template surface. Electrodeposition of metal contacts to the nanotube tips are then incorporated to complete a circuit. In addition, some embodiments of the present invention allow for a single (common) back contact to carbon nanotubes. Patterning of back electrodes prior to creating of the template will enable multiple independent back electrical contacts.

Carbon nanotubes are synthesized in a vertical channel of a nanoporous template to form an electronic current-carrying channel. Subsequently, metal is deposited into the template by electrodeposition using a conductive layer located underneath the template and resulting in the formation of nanowires that contact the bottom surface of carbon nanotubes in the template. Often, the bottom of the pores will contain an electrically insulating barrier. In such cases, the barrier can be removed by a variety of techniques. Some embodiments of the present invention include a means of creating channels in the barrier by exposure to a hydrogen plasma, which is also employed in a process of synthesizing carbon nanotubes (and therefore, nanotubes synthesis and base-pore opening occur about simultaneously in the same process).

If the carbon nanotubes have adequately small length, such that their tips are slightly exposed from the top of the template, electrodeposition will result in the formation of a metallic cap on the tip of the carbon nanotubes that may be used as a top electrical contact. In conjunction with the metallic nanowires contacting the carbon nanotubes from below, an electrical circuit is formed. If the carbon nanotubes obtain a sufficient length as to have a large fraction of their total length on the top surface of the nanotemplate, electrodeposition will initiate metallic nanoparticles around the nanotubes on the top template surface.

To create a vertical carbon nanotubes circuit with this scenario, an additional polishing step is used to establish vertical contact. The polishing procedure may proceed with or without the application of a mechanical stabilizing agent, such as spin on glass (SOG) or silicon dioxide. Briefly, a stabilizing agent is applied in sufficient quantity to fill the pores of the template and accumulate on the top template surface. Mechanical polishing is then utilized to remove the top of the stabilizing layer, including a small portion of the alumina template and that portion of the carbon nanotubes on or above the top template surface. A further electrodeposition of metal will establish a metallic cap on the exposed nanotubes tip that may be used as an electrical contact.

Although the procedure is outlined above with carbon nanotubes initiating from a nanoscale template, the procedure may proceed without the template with similar results.

Some embodiments of the present invention provide one or more benefits, although any particular embodiment of the present invention may not include any of these benefits. Some embodiments of the present invention include lithography-free contacts to carbon nanotubes. Yet other embodiments include vertical carbon nanotubes contacted in-place. Still other embodiments include a length of carbon nanotubes from contact-to-contact varied by adjusting Al film thickness. Further embodiments include annular contacts to carbon nanotubes. Yet other embodiments include porous anodic alumina thin-films comprising nanochannels assembled in long range order. Still further embodiments include contacted, vertical carbon nanotubes assembled in channels with long range order. In yet other embodiments, vertical carbon nanotubes enable the formation of wrap-around gate geometry for transistor devices. In still further embodiments, the present invention provides that supporting template (PAA) can be removed to release the nanowire-contacted carbon nanotubes for further functionalization elsewhere.

It is contemplated that various embodiments of the present invention can be used in a wide range of applications. A non-limiting list of these applications includes: vertical carbon nanotubes field-effect transistors (FETs); wrap-around gate carbon nanotubes FETs; chemical/biological sensing using the contacted carbon nanotubes; field and/or thermionic emission from vertical, nanowire-contacted carbon nanotubes; high-speed transistor applications; and low-power transistor applications.

SWNTs have been integrated into electronic and chemical sensing devices because of their electronic transport properties and potential for high-density integration. Current device contact metallization procedures include the direct deposition of lithographically defined metallic contact pads onto a substrate containing SWNTs or the dispersion of SWNTs onto pre-defined contact pads. These procedures generally exhibit low yields and are limited to two-dimensional planar architectures. Although horizontal structures have proven invaluable for examination of SWNT transport properties and functional material selection, their flexibility is limited and precludes the exploitation of the nanometer-scale diameter of SWNTs as a scaling metric for device integration. Although SWNTs offer superior electronic transport and are typically an order of magnitude smaller in diameter than MWNTs, a similar vertical SWNT device structure has not been developed because of the inability to synthesize SWNTs from mesoporous templates such as PAA using traditional techniques.

Various embodiments of the invention include the development of a metallization technique that establishes bottom and top contacts to SWNTs synthesized from within a PAA template in the form of Pd nanowires and nanoparticles, respectively. A schematic displaying the synthesis of the modified PAA template with SWNTs and their subsequent metallization is accompanied by field emission scanning electron microscope (FESEM) images of as-synthesized structures in FIG. 1.

Referring to FIG. 1(*g*), 1(*h*), and 1(*i*), a method for creating a vertical single-walled carbon nanotube (SWCNT) electronic device is realized using a SWCNT catalyst embedded into the walls of a porous anodic alumina (PAA) template 20. In one embodiment, the synthesis of the structure 20 begins with the deposition of thin films onto a crystalline substrate 21. The deposited films include an adhesion layer 22 between the bulk structure and the substrate, an electrically conductive layer 224, aluminum 26, a carbon nanotube catalyst metal 28, and an additional aluminum layer 30. The top aluminum layer, the CNT catalyst layer, and the bottom aluminum layer are then anodized to the conductive metal layer using standard procedures. The resulting structure contains ordered nanoscale pores whose walls are comprised of alumina except a local layer of embedded CNT catalyst.

Vertical single-walled and double-walled carbon nanotube (SWNT and DWNT) arrays have been grown using a catalyst 28 embedded within the pore walls of a porous anodic alumina (PAA) template 20. The initial film structure consisted of a $SiO_x$ adhesion layer 22, a Ti layer 24, a bottom Al layer 26, a Fe layer 28, and a top Al layer 30 deposited on a Si wafer 21. The Al and Fe layers were subsequently anodized to create a vertically oriented pore structure through the film stack. CNTs 32 were synthesized from the catalyst layer by plasma-enhanced chemical vapor deposition (PECVD). A nanowire 38 extends from a base of electrical contact to a CNT 32 within a given pore 34. Some CNTs 32 include a nanoparticle 36 deposited at the end of the CNT extending to the nanopore Yet other details of this method and related methods can be found in co-pending U.S. patent application Ser. No. 11/747,680, filed May 11, 2007, and incorporated herein by reference.

SWNTs initiate from within a modified PAA template containing a thin horizontal Fe catalyst layer embedded directly into the PAA pore cell walls. SWNTs are synthesized from the embedded catalyst layer by microwave plasma-enhanced chemical vapor deposition (PECVD). Selectivity of SWNTs is believed to be achieved by an $Al_2O_3$—Fe composite that restricts catalyst particle aggregation at elevated synthesis temperatures. Typically one SWNT emerges from each active pore, likely due to a limited hydrocarbon supply at the catalyst layer within the pores. Electrodeposition of Pd into the pores creates vertical Pd nanowire back contacts to the SWNTs. This lithography-free process thus provides a 'bottom-up' approach for establishing contact to templated SWNTS, which may be combined with further 'top-down' functionalization to create vertical SWNT FETs, chemical sensors, or field emission devices. For instance, a post-process patterning of the Ti underlayer, accomplishable by removing lithographically defined portions of the template and Ti, would enable independently addressable sets of devices at the back contact, making the vertical SWNT FETs suitable for integrated digital electronics.

Figure 1F:
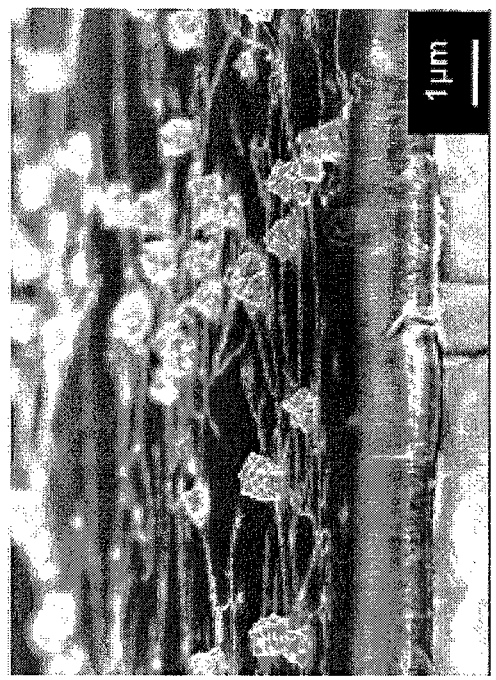
Figure 1E:
Figure 1D:
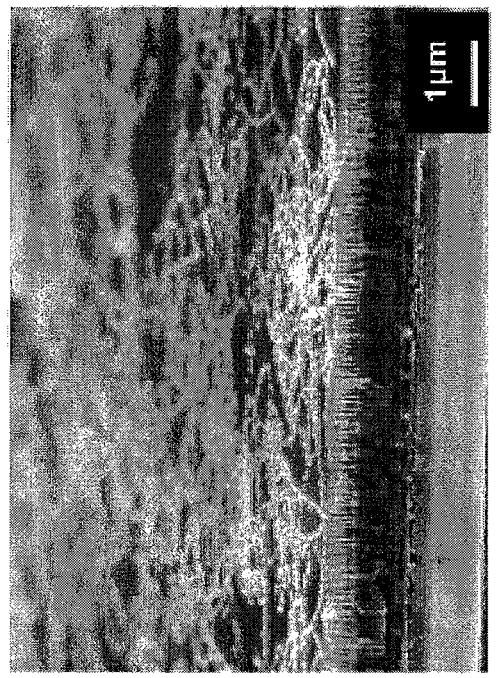
Figure 1G:
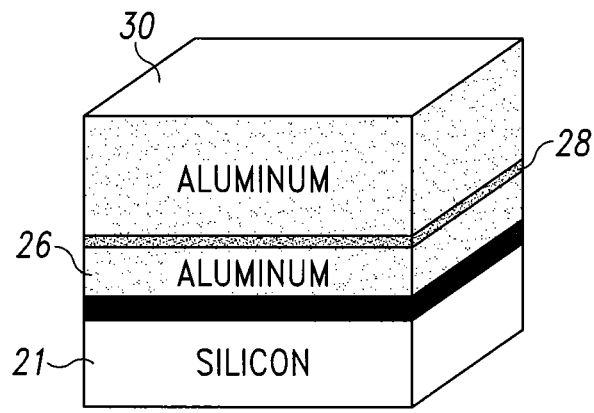
Figure 1H:
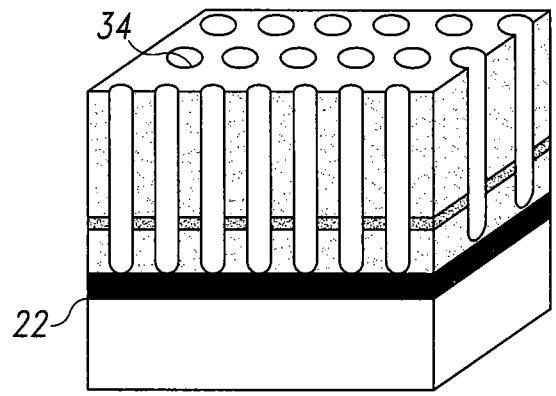
Figure 1I:
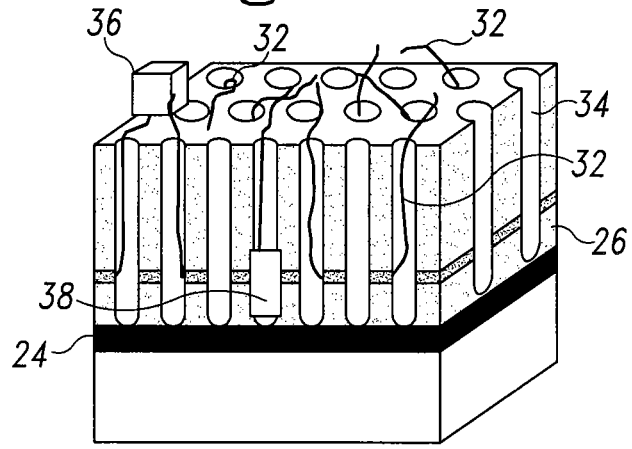

With regards to FIG. 1(f), note that the high contrast between SWNTs and the PAA template is caused by electron charging effects, which exaggerate the apparent diameter of the SWNTs where they physically contact the insulating PAA surface, as in FIG. 1(e), where the SWNT contacts the top of an adjacent pore wall fragment remaining after fracture of the template.

The synthesis of the modified PAA film begins with subsequent depositions of 50 nm of $SiO_x$, 150 nm of Ti, 100-500 nm of Al, 0.5-5 nm of Fe, and 350-700 nm of Al on an oxidized Si wafer using electron-beam evaporation at a base pressure of $5\times10^{-7}$ torr. The Al and Fe layers are then anodized using a standard two-step technique in 0.3 M oxalic acid at 5° C. A portion of the film is not anodized and is used during subsequent electrodeposition and I-V measurement steps. SWNTs are synthesized using microwave PECVD under reactor conditions of 10 torr, 800° C. substrate temperature (measured by dual-wavelength pyrometer), 50 sccm of $H_2$, 10 sccm of $CH_4$ and 300 W microwave power for 10 minutes.

In yet other embodiments, it is possible to synthesize nanotubes from a catalyst deposited on the bottom Ti layer, resulting in a titanium/catalyst/aluminum metal film stack, from bottom to top. However, it is possible that the resulting film stack may delaminate from the Ti substrate during nanotube synthesis. A preferred approach is to place the catalyst layer between two Al layers. Further, although various embodiments of the present invention have been demonstrated using iron as a catalyst, the present invention contemplates the use of any catalyst known to encourage growth of nanotubes. The electrodeposition metallization technique is substantially not affected by catalyst metal selection. In yet other embodiments, a metal nanowire is electrodeposited first and then used as a catalyst for subsequent CNT growth.

While PAA has a natural tendency towards hexagonally arranged pores, the nucleation of the pores at random sites of the Al surface creates the need for long anodization times on thick Al foils to allow for the pores to (due to the compressive stress in the template during formation) take on their hexagonal arrangement. For this reason, the use of thin-film PAA has traditionally been less common than that of PAA foils. However, since the pores will have a tendency to nucleate at defect sites on the Al surface, methods have been developed for creating ordered defects, which are simply dimples, in the Al surface prior to anodization. Of these methods, few have been developed for dimpling thin-film Al, largely due to the surface roughness of some deposited Al films and the inability to apply large amounts of pressure to the Al surface using stamps or molds as can be done with Al foils. Processes for dimpling thin-film Al have included the use of a focused ion beam (FIB) to mill dimples into the Al, but the challenge is in creating a process that is scalable to wafer-level. Various embodiments of the present invention pertain to the use of electron-beam lithography (EBL) and wet Al-etching is used to create large regions of ordered, thin-film PAA.

Figure 9B:
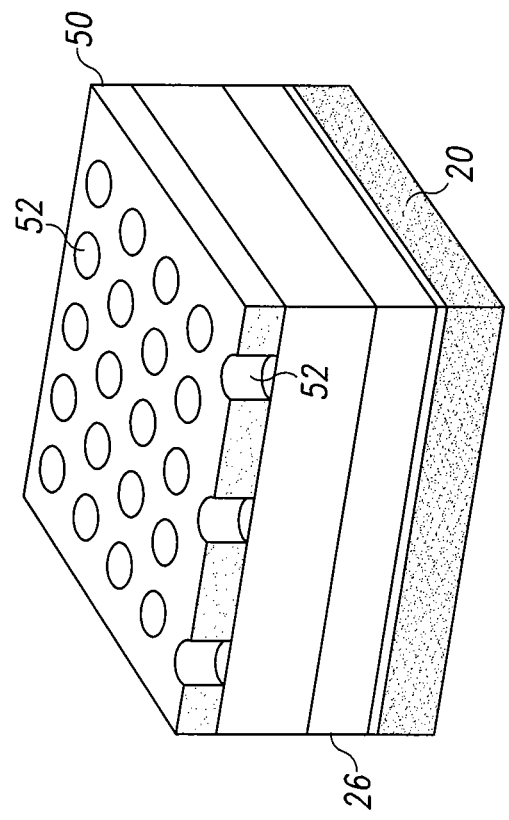
FIGS. 9(a)-9(d): A schematic of the process for obtaining pore order in thin-film PAA. (a) PMMA coated sample. (b) PMMA after EBL patterning. (c) Pattern transferred to Al film by wet etching. (d) Anodization of Al to form ordered PAA and subsequent synthesis of SWNTs from embedded catalyst layer.
Figure 9A:
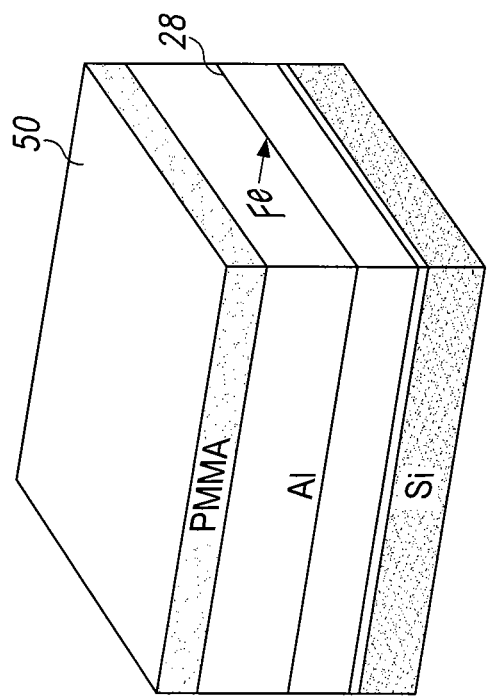
Figure 9D:
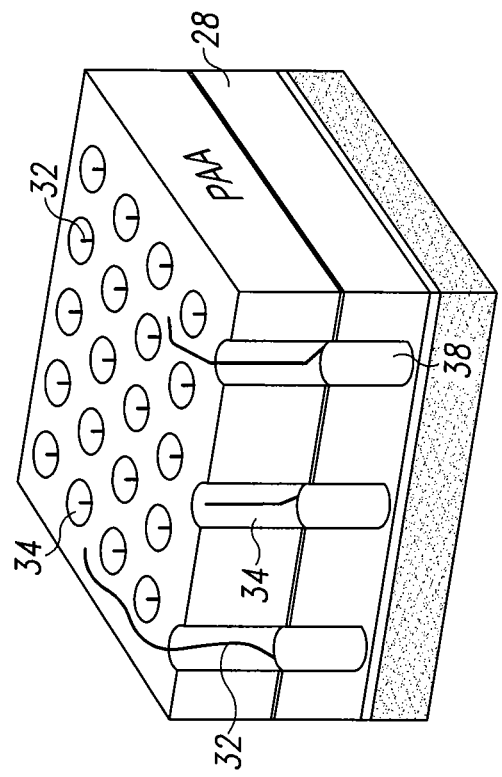
Figure 9C:
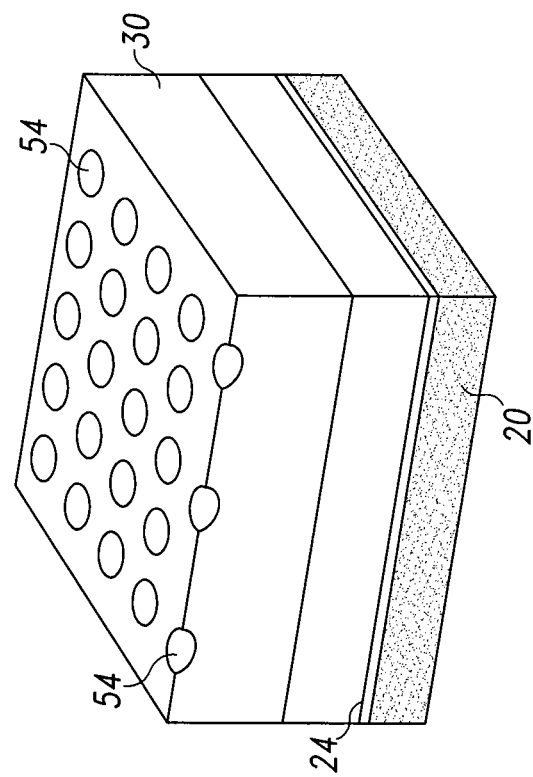
Figure 10:
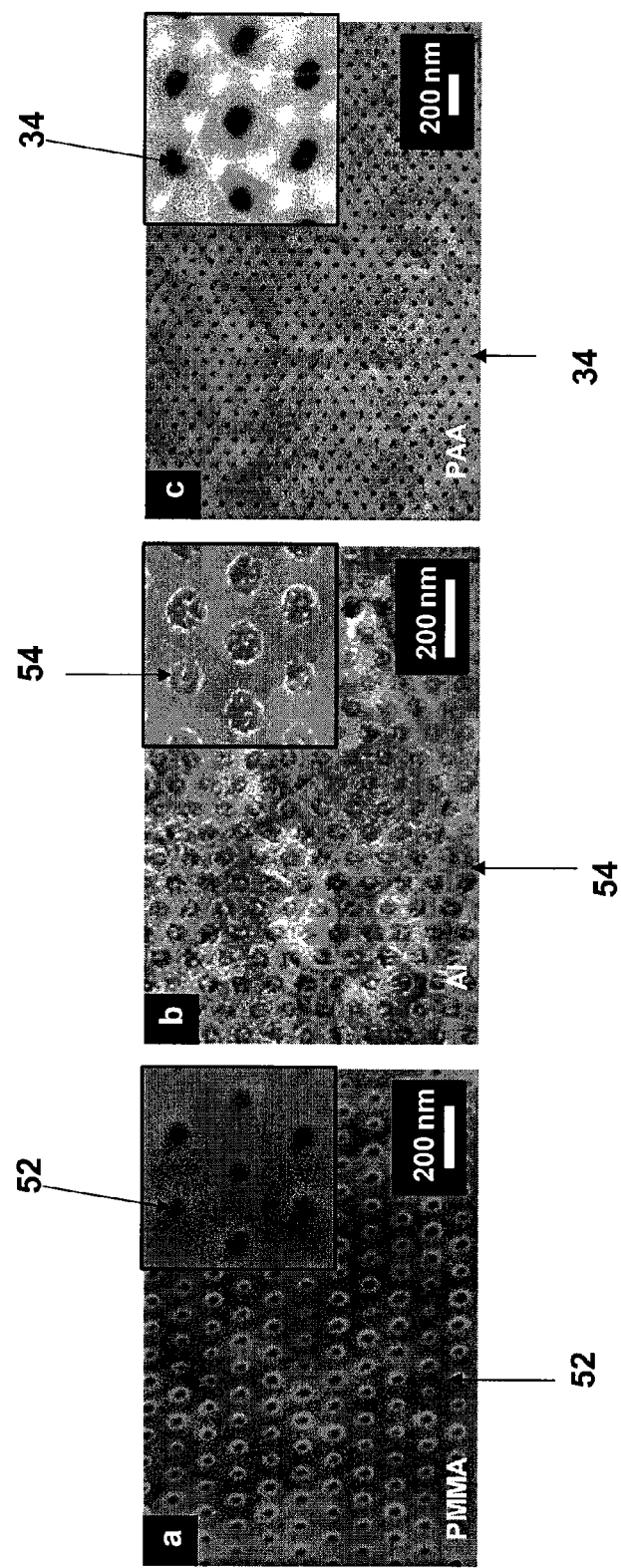

Referring to FIGS. 9 and 10, various embodiments of the invention include one of several processes for creating modified PAA thin-films with long-range pore order in which vertical SWNTs were synthesized. One of these processes is demonstrated herein using EBL. The first step in creating large regions of ordered, thin-film PAA using EBL is to pattern a resist layer 50. In designing the pattern to be written, one embodiment of the present invention contemplates control of both the shape of the defect 52 as well as the interspacing of the defects. Preferably, the pattern is created such that the holes 52 are spaced the proper distance apart and that they do not run together. With regards to choosing the EBL settings for exposing the polymethylmethacrylate (PMMA) resist, several factors should be considered. First, having Al layer 30 as the surface of the sample will cause more scattering of the electrons at the surface, which means the lower the current that can be used to expose the sample, the better. Secondly, the desired interpore spacing can be as small as 100 nm, which allows the use of actual features that have characteristic dimensions (such as diameter) less than 20 nm. The resolution of the electron beam should be chosen commensurate with the interpore spacing and feature size. One other parameter is the exposure dose; if a sample is underexposed then the pattern will not transfer to the underlying Al.

In one embodiment of the present invention, the settings for writing patterns with 100 nm spacing are a beam current of 500 pA, beam step size of 2 nm, resolution of 2 nm, and dose of 8000 µC/cm2. After the sample is exposed, the pattern is developed with constant agitation for 90 sec in MIBK developer diluted 1:3 with isoproponal. If the pattern has been sufficiently exposed and sufficiently developed, then the sample will now be at the stage depicted by the schematic in FIG. 9(b). The exposure of the resist layer to the EBL results in a plurality of exposed features 52, such that the resist layer does not cover corresponding portions of Al layer 30.

With the Al surface selectively exposed where the pattern has been developed, it can now be etched to transfer the pattern. A commercial Al etchant, including a phosphoric acid mixture, from Transene Company is used to etch the Al at room temperature. The sample is held vertically and agitated from side-to-side to ensure that the etchant proceeds to the Al surface through the patterned PMMA. A 20 sec etch can be used to transfer the pattern to the Al surface in the form of dimples or defects 54, as illustrated in FIG. 9(c). Following the etch, the PMMA is removed in acetone.

Anodization of the now dimpled Al surface will cause pores 34 to nucleate from the dimples 54 and thus form in the preselected interpore spacing, such as a hexagonally arranged template. The anodization voltage is selected with regards to the interpore spacing that was used, which can be obtained from various sources. For an interpore spacing of 100 nm, the anodization voltage is 40 V in 0.3 M oxalic acid. FESEM images of patterned PMMA with exposed features 52, an Al surface with dimples 54, and ordered pores 34 after anodization are shown in FIG. 10(a), (b), and (c), respectively. Note that the pores are demonstrated in a hexagonal arrangement herein, but several other long-range ordered arrangements are possible, including square-order and others.

Various embodiments of the present invention contemplate the use of porous anodic aluminum (PAA). It is understood that some embodiments utilize a method that includes establishing the location of the pores via EBL. Yet other embodiments contemplate the use of PAA in which the pores are created by other methods described herein. Yet other embodiments are applicable to PAA and other porous electrically insulative substrates created by any method.

Figure 2D:
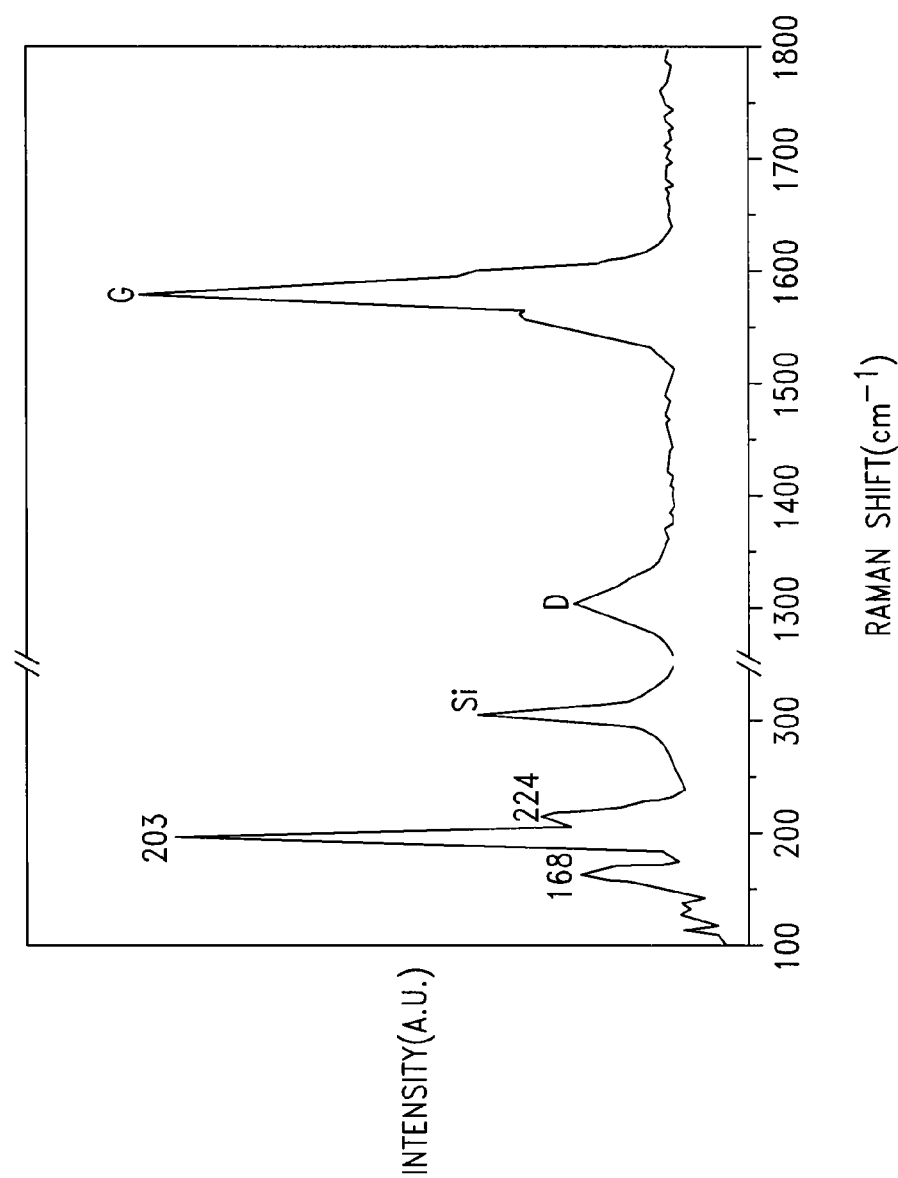
FIG. 2(d): Raman spectra of SWNTs grown from PAA obtained using 785 nm excitation wavelength.

SWNTs originate from the localized embedded catalyst layer located 150-200 nm above the bottom of the PM pores and emerge from the pores at the top PAA surface, forming vertical channels within the pores. The SWNTs continue to lengthen either in a vertical orientation as seen in FIG. 2a or along the top PAA surface after emerging from the pores, as shown in FIG. 2b. FESEM micrographs were obtained with a Hitachi S-4800, while high-resolution transmission electron microscope (HRTEM) micrographs were obtained using a FEI Titan 80/300 field emission electron microscope with a point-to point resolution of 2 Å at 300 kV. It appears that one nanotube emerges from each catalytically active pore. However, using scanning electron microsocopy, it is difficult to determine if what is seen is a single nanotube or perhaps a bundle of multiple nanotubes. Further, not all pores are occupied by a nanotube A typical HRTEM image of the SWNTs from this structure is shown in FIG. 2c. The high contrast between SWNTs and the PAA template caused by electron charging effects in the FESEM micrographs (such as FIGS. 1d-e and 2a,b) exaggerate the apparent diameter of the SWNTs. Micro-Raman spectra were obtained using a Senterra system with a 50× objective and 785 nm excitation wavelength. HRTEM analysis and micro-Raman spectra, found in FIGS. 2c and 2d, respectively, confirm the existence of SWNTs with diameters in the range of 1-2 nm. While large-diameter MWNTs grown from PAA templates generally fill their pores of origin, the diameters of SWNTs are extremely small compared to typical PAA pore diameters. This remaining volume within the vertical pores may be used for further functionalization of SWNTs, such as the application of a gate dielectric or biological agent.

The anodization of thin Al foils and supported Al films to form porous anodic alumina (PAA) has been rigorously studied and is relatively well understood. Similar films have been used for the templated synthesis of metallic nanowires and for the synthesis of large-diameter multi-walled CNTs (MWNTs). In addition, the anodization of co-sputtered films of Al and Fe (with uniformly distributed Fe) has been studied with Fe concentrations of 4 at. % and 7.5 at % using 0.01 M ammonium pentaborate as an anodization electrolyte. When anodized above threshold potentials, the nonporous anodized films developed voids due to the encapsulation of oxygen gas produced during the incorporation of Fe into the anodized film. The threshold voltages for void formation were dependent on Fe concentration in the alloy and decreased from a value of 300 V at 4 at. % Anodization of the alloy below the threshold value resulted in a uniform anodic film having a Fe concentration similar to that of the beginning metal alloy.

Although the precise mechanism for oxygen formation within the anodizing Al—Fe alloy is uncertain, the oxidation of $O^2$-ions at the moving anodized film/metal interface for other binary Al alloys (Al—Cr, Al—Au) during anodization produces similar high-pressure oxygen-filled bubbles and cavities. The chemical state of the Fe species incorporated into the anodized film has also not yet been determined. Similarly, the anodization of FVS0812 Al alloy, containing 4.3 at. % Fe among other alloying elements, in 1 M sulphuric acid resulted in a porous film comprised of multi-branched pores with many voids due to oxygen generation. The anodization of a thin film structure composed of a localized thin Fe film incorporated between two thicker Al layers to form a porous anodic film, however, has not been analyzed in terms of structural stability or the ability of the structure to sustain the catalytic production of carbon nanotubes (CNTs).

Single-walled CNTs (SWNTs) and double-walled CNTs (DWNTs) have been incorporated into a myriad of devices such as electronics sensors, and electron emitters because of their excellent transport and mechanical properties. The development of high-density CNT-based devices could be aided by the establishment of an easily manufactured and adaptable structure that can accommodate in situ formation of electrical contacts. Yet other embodiments of the present invention include the synthesis of a silicon-supported porous anodic Al—Fe—Al film structure that facilitates the selective catalytic growth of SWNTs and DWNTs, as confirmed by HRTEM and micro-Raman spectroscopy, while allowing for easy establishment of electrical contacts by electrodeposition of metal nanowire contacts. A detailed parameter study of the porous anodic multilayer structure with respect to CNT synthesis and structural integrity, however, has not previously been reported. For optimal CNT device integration, an uninterrupted vertical pore order (without branching) of the anodized structure and large population of pores containing CNTs are advantageous to the development of structures containing one functional device per vertical pore. This report details an experimental parameter study of catalytically active porous anodic Al—Fe—Al multilayer film structures with respect to pore aspect ratio, Fe layer thickness, and pre-anodization annealing. Performance metrics of the film structures are considered based on vertical pore order on either side of the Al—Fe—Al interface after anodization, and the resulting CNT density after PECVD synthesis.

Some embodiments of the present invention include catalytic film structures synthesized by successive depositions of SiO2, Ti, Al, Fe, and Al onto a thermally oxidized Si wafer using electron beam evaporation at a base pressure of $5 \times 10^{-7}$ torr or less. Consistent thicknesses of 50 nm $SiO_2$ and 150 nm Ti were deposited. The SiO2 layer acted as an adhesion layer, while the Ti layer may be used as an electrode for further processing, such as electrodeposition of metallic nanowires. The bottom Al layer thickness ranged from 100-200 nm, while the top Al layer varied from 300 to 700 nm. The bottom Al layer was chosen based on Pd deposition on CNTs from other experiments. Fe layer thicknesses ranged from 0.5 to 20 nm. Deposition rates of metals other than Fe were maintained at 1 nm/s or less, while the deposition of Fe was maintained at approximately 0.1 nm/s or less for a planar Al—Fe—Al interface.

Anodization of the Al and Fe layers proceeded using standard two-step anodization procedures. The anodization electrolytes examined include 0.3 M oxalic acid and 0.3 M sulfuric acid maintained at 5° C. Anodization voltages include 40 V for oxalic acid, and 20 V for sulfuric acid. Pore diameter and pitch may be controlled based on the anodization electrolyte and voltage. The height of the top anodized alumina layer can be partially controlled by the duration of the first anodization step and subsequent removal using the two-step procedure. The anodization current for Al layers was approximately 5 $mA/cm^2$, while the current reached as high as 1 $A/cm^2$ during anodization of the embedded Fe layer, depending on the Fe layer thickness and pre-anodization annealing conditions discussed in subsequent sections. The current produced by anodization of the Fe layer for samples that had undergone annealing prior to anodization was always reduced and was similar to that of pure aluminum anodization for films with Fe layers of 10 nm or less.

CNTs were synthesized in a microwave plasma-enhanced chemical vapor deposition (PECVD) system. Synthesis conditions were chosen based on optimized conditions used for SWNT growth using a MgO supported Mo/Co catalyst structure and previous experience with this catalyst structure. Standard synthesis conditions included 10 torr, 10 sccm $CH_4$, 50 sccm H2, 900° C. susceptor temperature (800° C. surface temperature as monitored by dual-wavelength pyrometer), and 300 W plasma power for ten minutes.

The aspect ratio, defined as the distance from the Fe layer to the top PAA surface divided by average pore diameter was examined to determine its effect on CNT catalysis. Although the transport mechanism of hydrocarbons to the catalyst layer is unknown, the pore diameter and depth of the Fe layer are expected to play a role in the availability of reactive hydrocarbons for catalysis of CNTs. Films had common layers of 50 nm SiO, 150 nm Ti, 200 nm Al, and 1 nm Fe. Samples anodized with sulfuric acid and 20 V potential incorporated a 350 nm top alumina layer and produced an average pore diameter of approximately 15 nm, while those obtained using oxalic acid and 40 V potential had either a top alumina layer thickness of 350 or 700 nm and produced an average pore diameter of approximately 30 nm. The thickness of the bottom alumina layer was found to have little significance with respect to CNT catalysis and was chosen based on optimum conditions for CNT functionalization. Aspect ratios of the anodized films ranged from approximately 12 for samples anodized with oxalic acid and a 350 nm top alumina layer to approximately 24 for samples anodized with sulfuric acid and for samples anodized with oxalic acid and a 700 nm top alumina layer.

To analyze the effect of aspect ratio, growth of CNTs from pores of various aspect ratios as a function of synthesis temperature were assessed. PECVD synthesis conditions were as previously stated with the exception of substrate temperature and synthesis time, which varied from 650 to 950° C. for 3 minutes. CNT density generally increased as aspect ratio decreased, as observed with large-diameter CNT synthesis from PAA templates [47]. Samples anodized using sulfuric acid produced sparse CNT populations at synthesis temperatures of 800° C. or less, with moderate CNT density observed between 850 and 950° C. Conversely, the excessive density and bundling of CNTs synthesized from films anodized with oxalic acid and a synthesis temperature of 900° C. or greater made accurate length measurements of individual CNTs difficult. As a result, samples anodized using sulfuric acid were analyzed in a temperature range from 850-950° C., while those anodized using oxalic acid were analyzed within the range of 650-850° C., in 50° C. increments. Electron charging effects between the CNTs and the top alumina surface facilitates FESEM observations of CNTs on the top film surface, as the charging greatly exaggerates the apparent CNT diameters.

FIG. 5.1(*a*)-(*d*) displays representative FESEM micrographs for samples anodized using oxalic acid with top alumina layers of 700 nm and 350 nm and sulfuric acid with a top alumina layer of 350 nm at 850° C. for 3 minutes. As stated above, the highest CNT density was observed on the sample with a 350 nm top layer anodized with oxalic acid, as seen in FIG. 5.1(*a*), slightly lower density was observed on the sample with a 700 nm top layer and similar anodization conditions (FIG. 5.1(*b*)), while substantially less density was observed with the sample anodized in sulfuric acid (FIG. 5.1(*c*)). Although the spatial density of pores for films anodized using sulfuric acid is greater than those anodized using oxalic acid, the decrease in CNT density for films anodized with sulfuric acid compared to a film of similar aspect ratio anodized in oxalic acid suggests that absolute pore diameter may have a more direct effect on CNT density than the aspect ratio previously defined, as the cross-sectional area of the pores may govern the access of hydrocarbon molecules to the catalyst layer.

To quantify the CNT growth from the various film structures, average growth rates of CNTs as a function of synthesis temperature were obtained. After CNT growth, samples were examined by angled cross-sectional FESEM analysis to obtain length distributions on the top PAA surface. The distance of the top alumina layer was then added to the CNT length obtained on the top surface to compute a total length. Although the average growth rate of the CNTs was observed to decrease with total synthesis time, as also observed by others, the evolution of average growth rates between various growth temperatures with time follows similar trends. The difference between the average growth rates measured at 700 and 800° C., as shown in FIG. 5.2(*a*), is approximately constant at syntheses times of 3 minutes and greater, such that comparisons of growth rates at 3 minute syntheses times is reasonable. A synthesis time of 3 minutes was therefore chosen for samples, as this time yielded CNTs with lengths that could be easily measured using FESEM imaging. An average of more than 75 CNTs was examined for each sample at a given temperature. A representative histogram of CNT lengths measured for a film anodized in oxalic acid with a 350 nm top alumina layer is shown in FIG. 5.1(*d*).

The average growth rate of CNTs from these film configurations as a function of synthesis temperature is shown in the Arrhenius plot in FIG. 5.2(b). Error bars indicate the standard deviation from the mean of sampled values. Although CNT density may vary between film structures, FIG. 5.2(b) shows that the average growth rate for a given temperature is nearly identical for the various structures. The growth rate of CNTs is approximately the same within the pore channel as it is on the top PAA surface, and may indicate that the base growth mechanism is the dominant growth mode from the catalytic layer.

Applying an exponential line fit to the combined data obtained from the film structures (shown in FIG. 5.2(b), the growth rate may be related to the diffusion rate of carbon into catalyst particles. The relationship is given by the Arrhenius law, given as k=Ae RT where k is the rate of carbon diffusion, A is the pre-exponential factor, $E_{ast}$ is the activation energy, R is the universal gas constant, and T is absolute synthesis temperature. Based on the Arrhenius law and the data in FIG. 5.2(b), an activation energy of 53 kJ/mol, or 0.52 eV, its observed for CNTs grown from the templated structures. Typical reported activation energies observed for PECVD synthesis of MWNTs using $C_2H_2$ as a carbon source are 0.30 eV using a Fe catalyst and range from 0.23 to 0.76 eV when using a Ni catalyst with CH4 as a carbon source during PECVD for synthesis of MWNTs. For comparison, an activation energy of 1.21 eV has been reported for similar syntheses conditions using thermal CVD with a Ni catalyst.

The difference in reported activation energy between thermal and plasma-enhanced CVD may be explained by examining the energies for the various processes in CNT synthesis. A similar analysis has recently been performed by Hofmann et al. to determine the likely diffusion path of carbon in the CNT synthesis process. Their analysis considers the dissociation of the precursor molecule, the adsorption of the precursor molecule to the catalyst surface, the diffusion of the growth species on or into the catalyst particle, and the incorporation of carbon into the precipitated CNT. Using a density functional theory approach, the analysis found an energy barrier for dissociation of $C_2H_2$ on the Ni(111) plane to be 1.3 eV, compared to 5.58 eV for a similar reaction in vacuum (underscoring the catalytic effect of the particle) and 0.9 eV for $CH_4$. In PECVD synthesis, however, dissociation of carbon precursors occurs in the plasma, thereby requiring less energy to be supplied in the form of catalyst heating.

The energy for carbon surface diffusion on a Ni(111) surface was calculated to be 0.4 eV while the activation energy for diffusion of carbon through bulk FCC Ni was found to be 1.6 eV. Surface carbon diffusion is believed responsible for the low activation energies exhibited for PECVD synthesis, while surface dissociation of carbon precursors at the catalyst surface leads to the relatively high activation for thermal CVD synthesis. Because the activation energy obtained from data obtained from FIG. 5.2 (b) agrees well with prior experiments on MWNTs and with theoretical predictions, it is possible that surface diffusion is the main mechanism for SWNT and DWNT synthesis from the anodized Al—Fe—Al structure, and that the addition of walls to MWNTs has little effect on activation energy using PECVD.

The thickness of the initial Fe layer influences the amount of catalytically active material available in the cell walls for CNT synthesis. However, during anodization of the Fe-rich interfacial region, material around the circumference of a pore is compressed by excessive oxygen formation, causing inter-pore void formations and necking of the interfacial region, as seen in FIG. 5.3(a). The anodization of an abrupt Fe-rich layer leads to a sudden increase in anodization current and a loss of anodization equilibrium, resulting in a re-initiation of pore spacing as anodization continues in the bottom Al layer. Consequently, vertical pore order is often interrupted at the Al—Fe—Al interfacial region, resulting in a high percentage of branching pores rather than purely vertical pores from the top PAA surface to the Ti layer.

During CNT synthesis, much of the catalytically active Fe-rich alumina is located in the necked region between pores and out of the direct line of sight of incoming hydrocarbons. Therefore, catalyst activity may be hindered by oxygen void formation. Although an increase in Fe layer thickness increases total Fe content, an increased Fe concentration correlates to increased oxygen formation and increased void formation, leading to inter-pore necking. In addition, anodization of samples with an initial Fe layer thickness of 5 rim or greater often led to sufficient oxygen production to damage a template, causing delamination of the film at the Al—Fe—Al interface during anodization. Correlation between Fe layer thickness and CNT density is low for Fe layers between 1 and 20 nm, although decreased density is observed using a 0.5 nm layer, as demonstrated more clearly in subsequent sections.

An alternative approach to enhance the catalytically active Fe within pore walls beyond that of a single Fe layer is the introduction of multiple thin Fe layers separated by an Al layer. In such a way, multiple catalytic sites may be located along the vertical length of a pore instead of one. Cross-sectional FESEM images of double and triple Fe layer films separated by a 100 nm Al layer clearly show sets of interfaces denoted by the levels of void formation and interpore necking, shown in FIG. 5.3. An increase in CNT density was observed using multiple Fe layer films as compared to a single layer with the same total Fe thickness, but these structures introduced an additional void layer, leading to a further loss of vertical pore order.

Although some $Fe^{2+}$ ions are inevitably lost to solution at the interfacial region during the anodic pore formation in a similar manner to $Al^{3+}$ ejection (see Appendix), little, if any, is expected to deposit on the top PAA surface and catalyze CNTs. This hypothesis is confirmed by FESEM observations of CNTs emerging from pores and cross-sectional images of CNTs originating at the localized catalyst layer, as shown in FIG. 5.3(d). Annealing of the Fe layer within the film, may decrease inter-pore void formation and increase CNT catalytic activity. Because less Fe is anticipated to be lost to solution with the reduction of void formation, the additional CNT density observed with films that undergo thermal diffusion may be attributed to Fe being directly accessible on the pore walls rather than Fe ions being deposited on the top PAA surface during anodization. Electrical contact to CNTs grown from these structures via Pd electrodeposition into the pores is established when the resulting Pd nanowires reach a sufficient length to contact the location of the initial Fe layer, confirming that the Fe layer is the initiation point for CNT synthesis. In such a way the nucleation of CNTs occurs at the embedded Fe layer rather than on the top PAA surface.

The anodization of Fe-rich alumina produces excess oxygen gas, the pressure from which damages the interfacial region, generates inter-pore voids, and leads to a loss of vertical pore order. To diffuse Fe into the surrounding Al films and to reduce the Fe concentration at the interface, annealing of the film stack was performed prior to anodization to activate Fe diffusion. Process temperatures from 300-550° C. in a dry air ambient were studied with various Al—Fe—Al film configurations. An annealing temperature above 550° C. affected the planarity of the anodized film surface, while temperatures of 400° C. or less were insufficient to affect the morphology of the anodized structure for durations less than 3 hours. The temperature range between 450-500° C. produced planar films and noticeable changes in the anodized structures for annealing times of one hour or less.

The deposited Fe layer thickness plays a role in the effectiveness of the annealing process in terms of vertical pore order of the anodized film and the resulting CNT density. A thicker initial Fe layer produces a larger total Fe dose and a higher Fe concentration throughout the effective diffusion length for a given diffusion temperature and time. Due to the thin Fe layer relative to the Al layers on either side, intermetallic $FeAl_3$ islands are more likely to form at the annealing temperature studied herein. With increasing annealing time, a relatively uniform $FeAl_3$ film will give way to form islands that would coarsen due to Oswald ripening. Concurrently, interdiffusion of Al and Fe would produce areas of Al containing negligible Fe between $FeAl_3$ islands, as the solubility of Fe in FCC Al is negligible. Sufficient coarsening of the $FeAl_3$ to disrupt the initial continuous layer and allow anodization is expected to result in a minimization of voids from oxygen production while increasing the vertical pore order. In such a way, anodization may proceed between $FeAl_3$ islands with minimal interference. In addition, with minimal coarsening, $FeAl_3$ islands are sufficiently small as to be easily incorporated into the alumina pore walls without excessive oxygen production, leading to an increased catalytically active area from which CNTs may originate.

FIG. 5.4 shows the effect of 450 and 500° C. diffusion for 20 and 60 minutes using a 2 nm initial Fe layer and 100 nm bottom Al layer. Based on cross-sectional FESEM images of the anodized structure, diffusion at 450° C. for an hour or less is insufficient to adequately reduce the concentration of Fe at the interface to prevent inter-pore necking and void formation. As mentioned previously, a nearly continuous FeAl3 layer may be present at this layer. Comparing FIG. 5.4(a) (20 min.) to FIG. 5.4(b) (60 min.), little change is observed with respect to inter-pore void formation at the Fe layer and vertical pore order for a diffusion temperature of 450° C.

A different phenomenon may be observed for a 500° C. diffusion temperature. For the range of diffusion times examined, areas of alumina with irregular pore structure may be observed near the initial Al—Fe—Al interface. The irregular material may span hundreds of nanometers from the interface, with an increase in coverage with diffusion time. Further, the inter-pore void formation at the interface is reduced compared to the 450° C. diffusions at similar times, with void production reduced for 60 minutes. Due to the increased temperature and time, the 500° C. diffusion could produce coarsened FeAl3 islands that are non-uniform in size and dispersion, which could explain the non-uniform distribution of irregular alumina areas. Alumina with irregular pores is believed to be produced in regions where Fe concentration is sufficient to produce oxygen gas, but at a slow enough rate that the gas may escape through the pores to the film surface, thus alleviating sufficient pressure so that large voids do not form. Similar pore structures were obtained during the anodization of FVS0812 Al alloy containing 4.3 at % Fe, in 1 M sulphuric acid. Some irregular areas were able to maintain a general vertical pore structure but produced pore walls that were not smooth, as seen in FIG. 5.4(d). Similar areas are rarely found for films employing 450° C. diffusion, as the highest Fe concentration is confined to the vicinity of the interface. Because the Fe concentration is higher in a more localized area about the interface under 450° C. diffusion, oxygen gas may be produced too rapidly to escape through the pores. The resulting rapid pressure buildup is the likely mechanism for the localized void production at the Al—Fe—Al interface.

FIG. 5.5 shows the effect of similar diffusion temperatures and times on a film structure with a nominal 0.5 nm initial Fe layer. Because the total dose of Fe is less than the 2 nm film discussed previously, different phenomena are observed. FIGS. 5.5(a) and (b) show that 450° C. diffusion at 20 and 60 minutes is sufficient to reduce inter-pore void formation, with small voids observed after a 60-minute diffusion. pores observed for both diffusion times displayed no loss of vertical pore order at the interface. Similarly, void formation is nearly eliminated using a 500° C. diffusion step. Irregular alumina and some loss of vertical pore order was observed below the interfacial layer for most 500° C. diffusions. It is possible that $TiO_x$ or Ti at the pore bottoms may inhibit the diffusion of Fe in the bottom Al layer, or that Ti may sufficiently diffuse into and react with the bottom Al at 500° C. to form Ti—Al intermetallic phases.

A reduction in the inter-pore void formation results in pores with smooth walls at the interfacial region. In comparison to pores with inter-pore necking at areas of high Fe concentration, smooth walls incorporate more Fe directly into the line of sight of hydrocarbons entering from the top of the pore. CNT density resulting from films undergoing thermal diffusion is increased as a result. FIG. 5.6 compares the CNT densities of similar Fe layer thicknesses with and without preanodization annealing. In general, a thicker initial Fe layer increases CNT density after pre-anodization annealing, although vertical pore order may be compromised with thicker Fe films, as previously discussed.

Films containing multiple Fe layers also benefit from pre-anodization annealing. CNT density increased by the addition of multiple Fe layers, as shown in FIG. 5.7. In fact, comparing FIG. 5.7(c) with FIG. 5.6(f), it is apparent that three Fe layers, each of 0.5 nm thickness, separated by 100 nm Al, produce a higher CNT density than a single 2 nm thick Fe layer. The increased density can be attributed to a greater surface area of alumina of sufficient Fe concentration to be catalytically within the pores, even when compared to a single layer of comparable total Fe. The pore order of samples containing multiple Fe layers that are subjected to pre-anodization annealing also exhibit improved vertical pore order, although irregular alumina areas may appear between Fe layers due to the resulting high Fe concentration. To assess the distribution of catalytically active Fe layers with multiple layers, electrodeposition of Pd may be used in future experiments as a diagnostic tool, as electrodeposition voltage changes indicate the initiation of contact between Pd nanowires to CNTs emerging from pore walls. Contact to the bottom of the SWNTs was established using electrodeposition of Pd into the bottom of the PAA pores to form individual nanowires within each pore.

Other embodiments of the present invention contemplate the use of metals other than Pd for creation of the nanowires. Pd is used in some embodiments because it results in a suitable Ohmic electrical contact with the nanotubes. Is some embodiments, Pd is used for an ohmic p-channel contact to CNTs, but for those embodiments in which there is CMOS functionalization, a different metal like scandium may be useful for n-channel operation. Further, the methods described herein have sufficient versatility to achieve contact doping, i.e., using metals with different work functions to alter the type of majority carrier in the channel.

Figure 8:
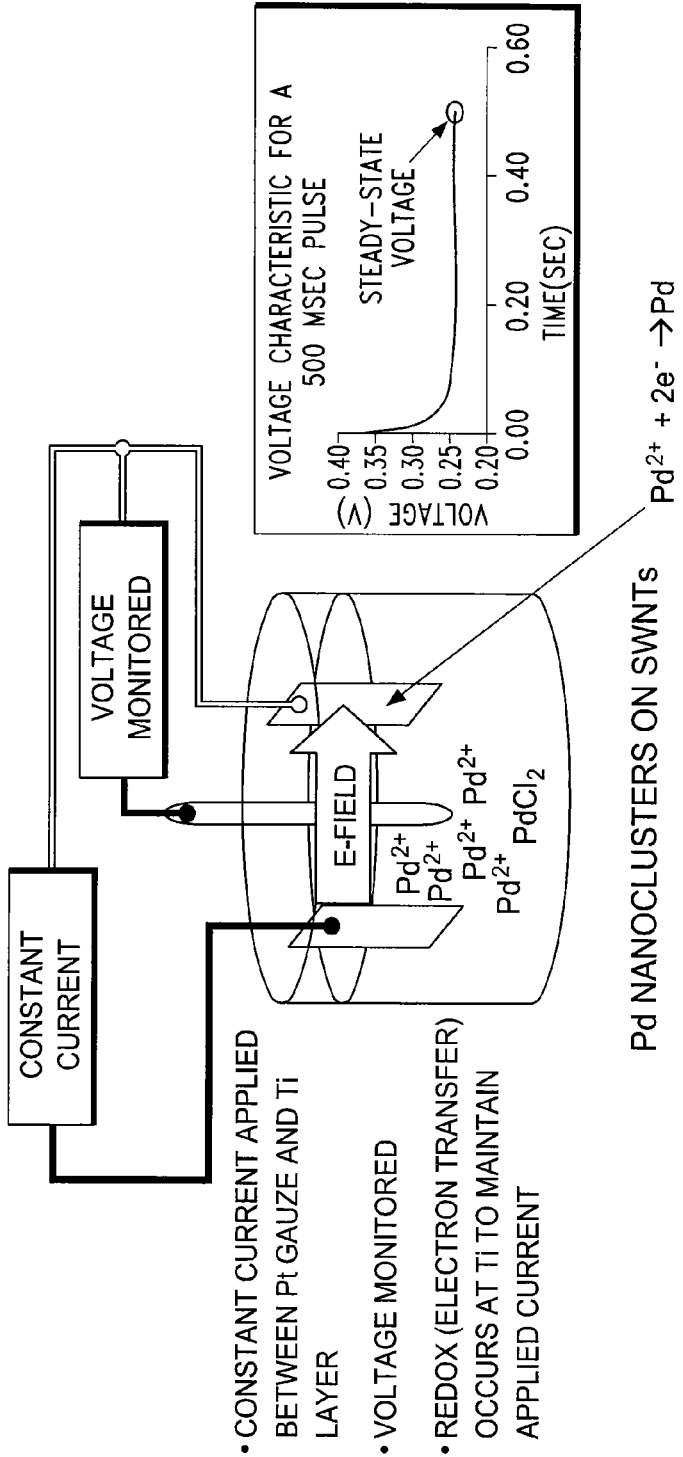

A Ti layer deposited beneath the anodized film served as a working electrode, providing an accessible conductive pathway for electrodeposition within the pores. Exposing a PAA template to a hydrogen-rich plasma environment increases the nanowire yield due to chemical reduction of the intrinsic alumina pore bottom Referring to FIG. 8, electrodeposition of Pd, known to produce ohmic contacts with SWNTs, proceeded using a chronopotentiometric process with 500 msec pulses and a constant current density of 1.5 mA/cm$^2$ in a solution of 2 mM PdCl$_2$ in 0.1 M HCl. An Epsilon BAS potentiostat monitored the potential between the working and reference electrodes. A 2.5×1.25 cm Pt gauze strip served as a counter electrode during deposition. Nanowire length was controlled by the number of deposition pulses.

Yet other embodiments use processes other than electrodeposition to form nanowires in the pores, such as the vapor-liquid-solid (VLS) method. However, the VLS method is generally used for the growth of semiconductor nanowires from metallic catalysts, and is therefore useful in those embodiments not utilizing ohmic contacts to CNTs. The VLS method is used to grow semiconductor nanowires where there is an acceptable solubility limit of the vapor precursor in the catalyst to provide a driving force for nucleation of the nanowire. Metalloids such as silicon (that yield semiconductors in crystalline form) generally have limited solubility in the metal catalyst particle. It is also generally true that VLS nanowires are single-crystalline or nearly so, and that the excess interfacial energy associated with grain boundaries will reduce or eliminate the driving force for growing the nanowire.

Physical and electrical contact between the Pd nanowires and SWNTs occurs when Pd nanowires are sufficiently long to reach the elevated Fe catalyst layer from which SWNTs originate. After electrical contact is established, continued deposition shifts the dominant location of Pd deposition to the top PAA surface, where Pd nanoparticle formations occur around the SWNTs, as shown in FIG. 1e. Examination of the steady-state electrodeposition voltage associated with each deposition pulse reveals a temporary decrease in voltage followed by a recovery period. Such a signature is not present with electrodeposition in templates without SWNTs (see FIG. 3a). FESEM micrographs confirm that the onset of the potential drop coincides with the Pd nanowire deposition front reaching the catalyst layer, and thus the bottom of the SWNTs.

This voltage reduction is likely due to an increase in the surface area of negative cathodic charge caused by the addition of conductive SWNTs to the working electrode network. SWNTs, therefore, become conductive pathways during the electrodeposition process and serve as initiation sites for Pd deposition. The observation of this potential drop during electrodeposition for every sample containing SWNTs is evidence of the nucleation of the SWNTs from the embedded catalyst layer within the pores. When the deposition was intentionally terminated before this signature occurred, the Pd nanowires were found to terminate below the embedded catalyst layer. Conversely, when deposition was allowed to proceed beyond the period of voltage reduction, the Pd nanowires extended above the catalyst location.

Figure 3A:
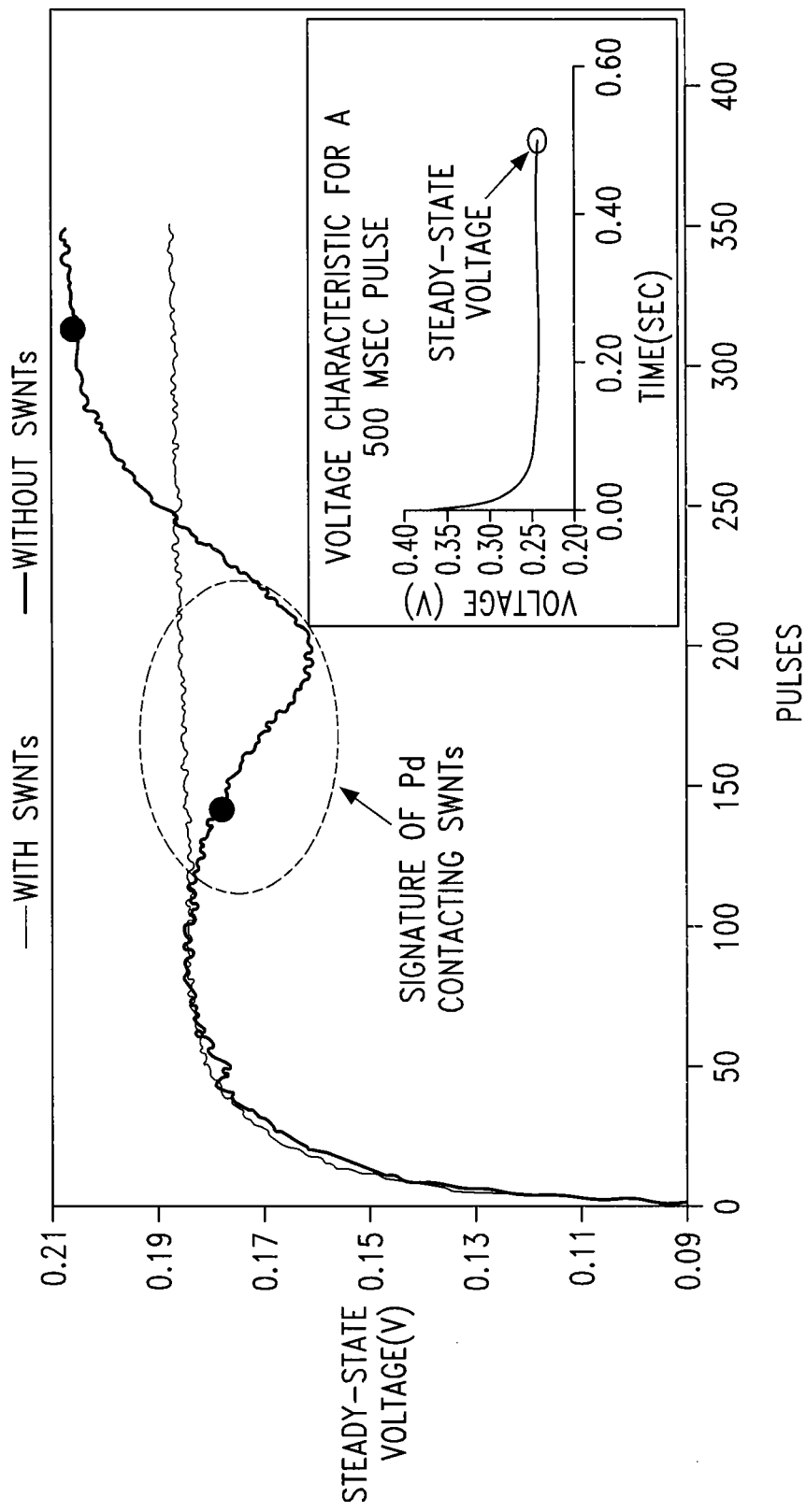
FIG. 3(a): Steady-state electrodeposition voltage as a function of constant-current pulse number. Contact between Pd nanowires and SWNTs results in a decrease in electrodeposition voltage between the working and reference electrodes due to the addition of cathodically charged surface area from the conducting SWNTs and resulting Pd nanoparticles, reducing the voltage required to maintain a constant current. Continued deposition results in concentric Pd nanoparticle formation around SWNT defect sites.
Figure 3C:
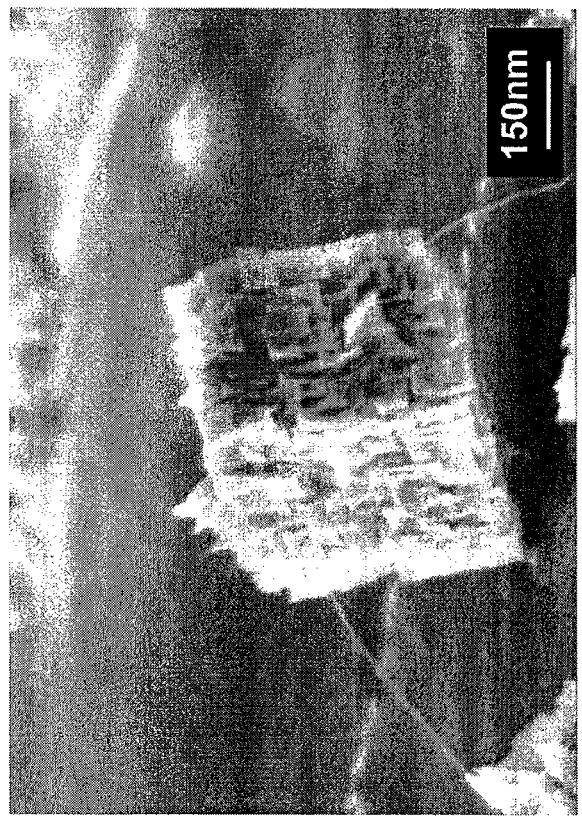
FIG. 3(c): FESEM images of Pd nanoparticle after 325 electrodeposition pulses. Nanoparticle size is approximately 200 nm.
Figure 3B:
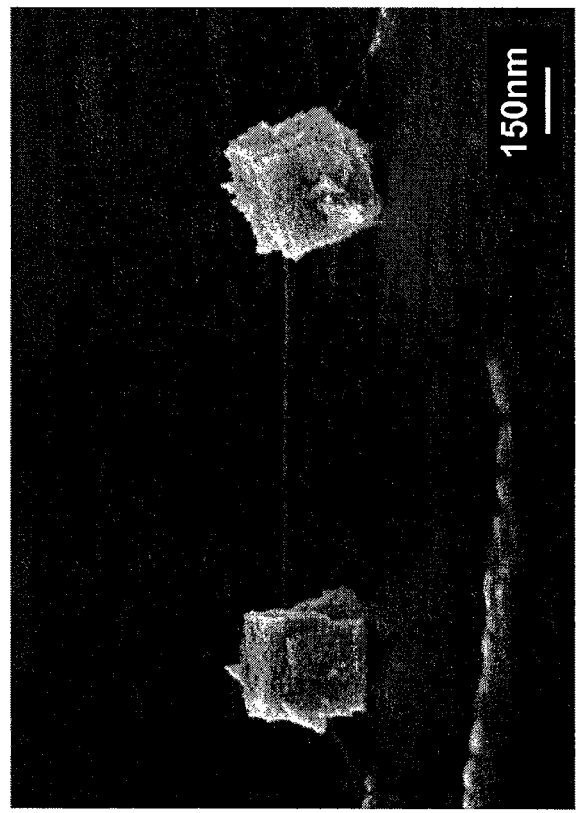
FIG. 3(b): FESEM images of Pd nanoparticle formation after 145 pulses. Nanoparticle size is approximately 60 nm.

Continued Pd electrodeposition past the establishment of SWNT contact results in the formation of Pd nanoparticles that concentrically surround SWNTs on the top PAA surface, as shown in FIG. 3b-c. Many of the clusters exhibited cubic or a combination of cubic and pyramidal geometries. These geometries are consistent with the expected crystal forms associated with the point group of the face-centered cubic structure of Pd. Ceasing the deposition of Pd prior to the nanowire array reaching the catalyst layer yielded no cluster formation on SWNTs, confirming that nucleation of SWNTs occurs at the localized iron layer and that the conductive pathway for electrodeposition of Pd clusters is through SWNTs. Furthermore, additional electrodeposition past the initiation of contact results in larger nanoparticles, allowing for cluster size control as shown in FIG. 3b-c. This nanoparticle deposition process has been controlled to synthesize Pd nanoparticles ranging from sub-10 nm to 500 nm by variation of total deposition time. Pd nanoparticles exhibit nearly uniform sizes, indicating that initiation of contact between Pd nanowires and the bottom of the SWNTs is established nearly simultaneously across a given sample and that no new nucleation sites are formed during the electrodeposition process. The initiation of metallic nanoparticles during electrodeposition processes apparently occurs primarily at SWNT defect sites, with fewer nanoparticles per length indicating better SWNT wall quality.

Hydrocarbon plasma synthesis environments similar to that in this study have been linked to an increase in SWNT defects and a decrease in the number of small-diameter SWNTs due to atomic hydrogen etching. Pd nanoparticles were not observed in PAA pore channels, suggesting that the pore walls may shield SWNTs from energetic hydrogen ions from the plasma, resulting in high quality, defect-free vertical SWNT channels. Interest in decorating SWNTs with metallic nanoparticles has increased in recent years, with applications in sensing, catalysis, and defect identification. Some embodiments of the present invention decorate the SWNTs, without altering the surrounding substrate, as is often observed with other in situ decoration techniques. The process also allows for large-scale electrical contacting of SWNTs, as electrical contact is established underneath the decorated SWNT surface, i.e., no additional area is typically used for external contact pads. Pd nanoparticles form concentrically on the SWNTs, lifting the SWNT from the PAA surface (see FIGS. 3(b) and 3(c) after nanoparticle growth allowing for annular, nominally single-crystal SWNT contact.

Contact to the bottom of the SWNTs was established using electrodeposition of Pd into the bottom of the PAA pores to form individual nanowires within each pore. A Ti layer deposited beneath the anodized film served as a working electrode, providing an accessible conductive pathway for electrodeposition within the pores. Exposing a PAA template to a hydrogen-rich plasma environment increases the nanowire yield due to chemical reduction of the intrinsic alumina pore bottom. Further, the hydrogen-rich plasma acts as a reducing agent for penetrating the aluminum oxide barrier at the bottom of each pore, allowing access to the underlying conductive layer for use in electrodeposition. Other embodiments utilize other techniques for barrier removal (reverse anodic anodization, ion milling, etc.). Preferably, the barrier oxide should be penetrated sufficiently to obtain electrical access to the underlying conductive layer.

Electrodepostion of Pd, known to produce ohmic contacts with SWNTs proceeded using a chronopotentiometric process with 500 msec pulses in a PdCl$_2$ solution. Nanowire length was controlled by the number of deposition pulses.

Physical and electrical contact between the Pd nanowires and SWNTs occurs when Pd nanowires are sufficiently long to reach the elevated Fe catalyst layer from which SWNTs originate. After electrical contact is established, continued deposition shifts the dominant location of Pd deposition to the top PAA surface, where Pd nanoparticle formations occur around the SWNTs, as shown in FIG. 3. Examination of the steady-state electrodeposition voltage associated with each deposition pulse reveals a temporary decrease in voltage followed by a recovery period. Such a signature is not present with electrodeposition in templates without SWNTs (FIG. 3a). FESEM micrographs confirm that the onset of the potential drop coincides with the Pd nanowire deposition front reaching the catalyst layer, and thus the bottom of the SWNTs. This voltage reduction is likely due to an increase in the surface area of negative cathodic charge caused by the addition of conductive SWNTs to the working electrode network. SWNTs, therefore, become conductive pathways during the electrodeposition process and serve as initiation sites for Pd deposition.

Using the Ti layer as the working electrode, contact to the bottom of the SWNTs was established by electrodepositing Pd into the bottom of the PAA pores to form individual nanowires. Exposing a PAA template to a hydrogen-rich plasma environment increases the nanowire yield due to reduction and etching of the alumina pore bottom. Pd, known to produce ohmic contact with SWNTs was electrodeposited using a chronopotentiometric process with 500 msec pulses in a $PdCl_2$ solution. Nanowire length was controlled by the number of deposition pulses, with physical contact between the Pd nanowires and SWNTs anticipated when Pd nanowires are of sufficient length to reach the elevated Fe catalyst layer from which SWNTs originate. Examination of the steady-state voltage associated with each pulse reveals a localized decrease in voltage followed by a recovery period. Such a signature is not present with electrodeposition in templates without SWNTs (see FIG. 3 (a)). FESEM micrographs confirm that the onset of the potential drop corresponds with the Pd nanowire deposition front reaching the catalyst layer, and thus the bottom of the SWNTs. This reduction in voltage is due to an increase in the surface area of negative cathodic charge caused by the addition of conductive SWNTs to the working electrode network. SWNTs, therefore, become conductive pathways during the electrodeposition process and may themselves serve as initiation sites for Pd deposition.

Figure 4A:
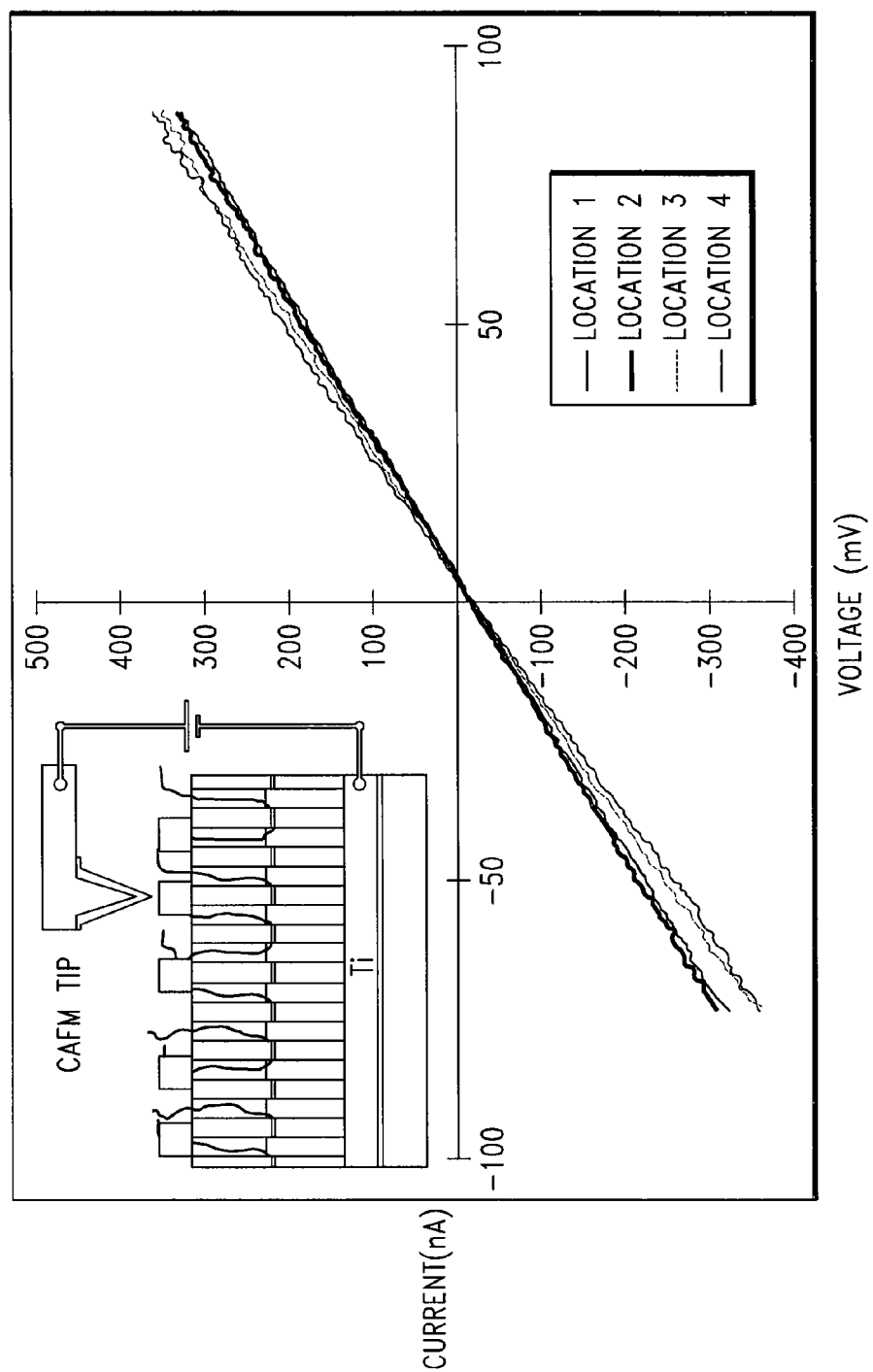
FIG. 4(a): Room temperature I-V characteristics obtained using a conductive atomic force microscope (CAFM). Measurements obtained by contacting the CAFM tip to an annular Pd nanoparticle (200 nm diameter) deposited around a SWNT on the PAA surface and applying a bias between the tip and the Ti layer. The Ti layer is connected to the Pd nanowires which subsequently contact the SWNTs, completing the two-terminal quasi-vertical SWNT network. Measurements were obtained from several locations, with four representative measurements shown to demonstrate the consistency of the conductance between SWNTs.
Figure 4B:
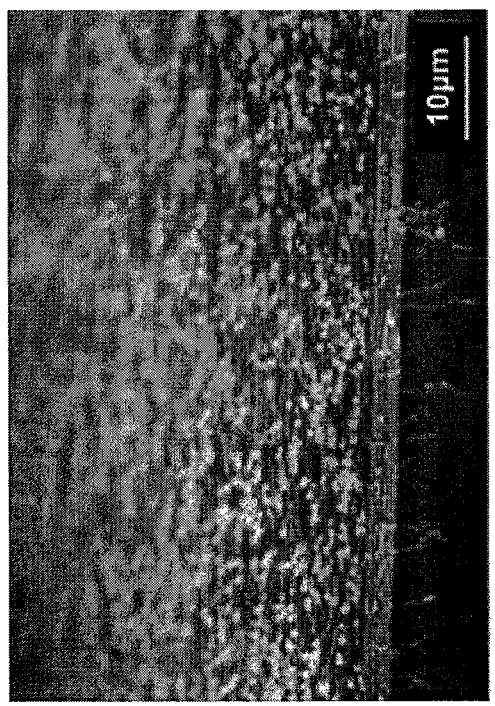
FIG. 4(b): Tilted FESEM cross-section showing Pd nanoparticle density on PAA surface.

To obtain two-terminal SWNT electrical characteristics, conductive atomic force microscopy (CAFM) was employed to contact individual Pd nanoparticles on the PAA surface. A Veeco Dimension 3100 AFM with CAFM extension module incorporating a Veeco SCM-PIC silicon cantilever coated with 20 nm Pt—Ir was used to produce I-V measurements. Pd nanoparticles were first identified using contact mode topography before being engaged. Pd nanowires (via the Ti layer) acted as the bottom contact, while the SWNT served as the electronic channel. Voltage to the tip was varied from 100 mV to 100 mV, while the current was recorded at the Ti layer. Typical I-V characteristics, as shown in FIG. 4(a), reveal ohmic contacts with a resistance of approximately 200 kOhms . Reported resistances for SWNTs incorporating planar geometries include a Ti/Au contacted semiconducting SWNT with a 5 micron channel (250 kOhms), and a Pd contacted semiconducting SWNT with a 300 nm channel (100 kOhms). Considering reported residence values and the contact configuration in the present circuit, the measured resistance of approximately 200 kOhms is representative of a semiconducting SWNT. No current was observed when the CAFM tip was placed in contact with the bare PAA surface, confirming that SWNTs were the pathway for current flow.

The catalytically active PAA structure begins with subsequent depositions of 50 nm of $SiO_x$, 150 nm of Ti, 100-500 nm of Al, 0.5-5 nm of Fe, and 350-700 nm of Al on an oxidized Si wafer using electron-beam evaporation at a base pressure of 5×10−7 torr. The Al and Fe layers are then anodized on a majority of the sample using a standard two-step technique in 0.3 M oxalic acid at 5° C. The remaining film is not anodized and is used to establish electrical contact during subsequent electrode-position and I-V measurement steps. SWNTs are synthesized from the embedded catalyst layer by microwave PECVD using the synthesis conditions of 10 torr, 800° C. substrate temperature (measured by dual-wavelength pyrometer), 50 sccm of H2, 10 sccm of $CH_4$ and 300 W microwave power for 10 minutes.

Micro-Raman spectra were obtained using a Senterra spectrometer with a 50× objective and 785 nm excitation wavelength. FESEM micrographs were obtained with a Hitachi S-4800, while HRTEM micrographs were obtained using a FEI Titan 80/300 field emission electron microscope.

Electrodeposition of Pd proceeded using a chronopotentiometric process with 500 ms pulses and a constant current density of 1.5 mA/cm² in a solution of 2 mM PdCl2 in 0.1 M HC1. An Epsilon BAS potentiostat monitored the potential between the working and reference electrodes. A 2.5× 1.25 cm Pt gauze strip served as a counter electrode during deposition. A Veeco Dimension 3100 AFM with CAFM extension module incorporating a Veeco SCMPIC silicon cantilever coated with 20 nm Pt—Ir was used to produce I-V measurements. Pd clusters were first identified using contact-mode topography before being engaged. Voltage to the tip was varied from −100 mV to 100 mV, while the current was recorded at the Ti layer.

Although resistance values corresponding to approximately half the reciprocal of the quantum conductance $(G_o \sim (12.8\ k\Omega)^{-1})$ would be expected for ballistic SWNTs with low-resistance contacts, higher resistance values have been observed for SWNTs longer than the coherence length, even with high-quality ohmic contacts. In semiconducting SWNTs, the "on" resistance (at large gate biases) has been reported to vary from approximately $1.2/G_o$ at a gate length of 300 nm to $6/G_o$ at a gate length of 3 μm. In metallic SWNTs, the coherence length has been determined to be approximately 2 μm, with the resistance increasing by 4 kΩ per μm of channel length. In the current study, the distance between a Pd nanoparticle (top contact) and the associated Pd nanowire (bottom contact) is not known, but appears, on average, to be greater than 10 μm. Therefore, the SWNTs are expected to conduct in the non-ballistic regime, and resistance values larger than $1/G_o$ are expected even with low-resistance contacts. In addition, the observation of linear I-V characteristics indicates that the contacts are not highly rectifying. Although the present experiments do not allow direct measurements of contact resistance, ohmic contacts of reasonable quality appear to have been achieved. The conduction path for each measurement could include more than one SWNT, because the random orientation of the SWNTs on the PAA surface could provide a number of intersections between SWNTs. However, each of the reported I-V characteristics involves a single Pd nanoparticle and therefore includes the resistance of that contact.

Various embodiments of the present invention include the synthesis of SWNT arrays that are metallized in situ without the need for lithography. SWNTs are synthesized from within vertical channels and are annularly contacted from the bottom by Pd nanowires from within their pore of origin and by Pd nanoparticles on the top template surface using a single electrodeposition step. The diameter and length of the Pd nanowires and the size of Pd nanoparticles can be controlled by selection of the PAA template anodization parameters and Pd electrodeposition time, respectively. The resulting electrically contacted PAA/SWNT structure affords straightforward functionalization of SWNTs within the template due to the free volume within each pore cell and lends itself to applications in electronics, chemical and biological sensing.

Although resistance values corresponding to approximately half the reciprocal of the quantum conductance ($G_o \sim (12.8 \text{ k}\Omega)^{-1}$) would be expected for ballistic SWNTs with low-resistance contacts, higher resistance values have been observed for SWNTs longer than the coherence length, even with high-quality ohmic contacts. In semiconducting SWNTs, the "on" resistance (at large gate biases) has been reported to vary from approximately $1.2/G_o$ at a gate length of 300 nm to $6/G_o$ at a gate length of 3 μm. In metallic SWNTs, the coherence length has been determined to be approximately 2 μm, with the resistance increasing by 4 kΩ per μm of channel length. In the current study, the distance between a Pd nanoparticle (top contact) and the associated Pd nanowire (bottom contact) is not known, but appears, on average, to be greater than 10 μm. Therefore, the SWNTs are expected to conduct in the non-ballistic regime, and resistance values larger than $1/G_o$ are expected even with low-resistance contacts. In addition, the observation of linear I-V characteristics indicates that the contacts are not highly rectifying. Although the present experiments do not allow direct measurements of contact resistance, ohmic contacts of reasonable quality appear to have been achieved. Further, the conduction path for each measurement could include more than one SWNT, because the random orientation of the SWNTs on the PAA surface could provide a number of intersections between SWNTs. However, each of the reported I-V characteristics involves a single Pd nanoparticle and therefore includes the resistance of that contact.

Various embodiments of the present invention include the synthesis of SWNT arrays that are metallized in situ without the need for lithography. SWNTs are synthesized from within vertical channels and are annularly contacted from the bottom by Pd nanowires from within their pore of origin and by Pd nanoparticles on the top template surface using a single electrodeposition step. The diameter and length of the Pd nanowires and the size of Pd nanoparticles can be controlled by selection of the PAA template anodization parameters and Pd electrodeposition time, respectively. The resulting electrically contacted PAA/SWNT structure affords straightforward functionalization of SWNTs within the template due to the free volume within each pore cell and lends itself to applications in electronics, chemical and biological sensing.

Investigation of SWNT synthesis parameters using microwave PECVD was performed utilizing a Mo/Co catalyst embedded in an MgO support. A temperature window for SWNT catalytic existed between susceptor temperatures of 800° C. to 950° C., corresponding to catalytic surface temperatures of 710° C. to 823° C., with yield and quality increasing with increased temperature. SWNT catalytic activity was further enhanced by an increased $CH_4:H_2$ flowrate ratio and by increased plasma power. Catalytic activity remained for synthesis times up to 3 hours.

The addition of dc substrate bias during PECVD synthesis effected on the SWNT product. Using the previously mentioned Mo/Co catalyst, a systematic variation of substrate bias from −250 to +250 V with respect to the chamber walls was performed at otherwise standard synthesis conditions. Both the polarity and the magnitude of the applied bias changed the SWNT products. The application of a negative bias led to freestanding vertical SWNTs, decreased spatial density, and the preferential synthesis of larger diameter SWNTs with semiconducting chiralities. Conversely, the application of positive bias led to little enhancement in SWNT vertical alignment, a increase in SWNT density, and the emergence of smaller-diameter SWNTS without altering the selectivity of semiconducting and metallic chiralities. The changes in SWNT yield and properties may be explained by the attraction or mitigation of $H^+$ ions at the growth substrate due to a change in the electric field within the plasma sheath region directly above the growth substrate.

A catalytically active porous anodic Al—Fe—Al film supported on silicon was used to synthesize SWNTs and DWNTs from a PAA template. To synthesize the film structure, a thin Fe catalyst layer was deposited between aluminum films and anodized, creating a porous anodic structure with Fe embedded directly into the pore walls. CNTs, synthesized using microwave PECVD synthesis, initiated from the embedded Fe layer and grew to the top of the pores. Based on CNT density and film stability during anodization, Fe was found to be a compatible catalyst metal for integration into the porous structure. High-resolution TEM analysis and Micro-Raman spectroscopy confirm that the CNTs grown from the structure SWNTs and DWNTs having a diameter between 1-2 nm.

A parametric study of the porous anodic Al—Fe—Al template was conducted to determine the influence of pore aspect ratio, Fe film thickness, and pre-anodization diffusion with respect to CNT density and vertical pore order. The study reveals that, for film structures not undergoing thermal diffusion prior to anodization, inter-pore voids at the Al—Fe—Al interface foul vertical pore order. In addition, pores with relatively large aspect ratios generally yield CNTs of lower density but of equivalent length to those of lower aspect ratios. Based on the CNT growth rates from films of various aspect ratios, an activation energy of 0.52 eV was acquired, suggesting that surface diffusion of carbon on the catalyst particles may be the dominant mechanism for CNT growth. CNT density was relatively unaffected by the initial Fe layer thickness without performing thermal diffusion, though inter-pore void formation increased with thicker Fe films due to oxygen gas formation. Templates employing multiple Fe layers, separated by 100 nm of Al, yielded greater CNT density than films containing a single Fe layer, though vertical pore order was diminished.

Pre-anodization thermal diffusion of the Fe in film structure, however, improved the vertical pore order and increased CNT density. The diffusion of Fe within the metal film may decrease void formation and assist in the formation of vertical pores with smooth walls during anodization. Amorphous alumina, however, may form during anodization if large areas of excessively Fe-rich Al are present. When employing pre-anodization thermal diffusion, CNT density increased with an increase in Fe layer thickness, and multiple Fe layers separated by Al resulted in high CNT density and improved pore order, although some amorphous alumina formed between Fe layers due to a high Fe concentration.

The in situ nanoscale contact metallization of SWNTs grown from the template structure, without the need for lithography, was exhibited. The CNTs were annularly contacted by Pd nanowires from the pore bottoms and Pd nanoparticles on the top PAA surface using a single electrodeposition step. Conductive AFM electrical measurements revealed ohmic contact in the Pd nanowire/CNT/Pd nanoparticle network. The resulting PAA/CNT structure affords easy functionalization of CNTs within the template due to the free volume within each pore cell and lends itself to applications in electronics, chemical and biological sensing.

The porous Al—Fe—Al structure for CNT device integration described herein is useful with the deposition of a single, bulk bottom electrical contact. By controlling the electrodeposition of Pd (or other metal) into the porous anodic Al—Fe—Al pore bottoms, while maintaining minimal decoration of the CNTs on the top film surface, an array of CNTs sharing a single common bottom electrical contact may be produced. One film structure to facilitate this type of device would incorporate a thin bottom Al layer, thereby initiating CNT synthesis near to the conductive Ti layer and requiring minimal contact metal electrodeposition time.

One application of a one-terminal CNT device structure is electron field emission. Field emission devices rely on a local electric field enhancement due to sharp emitter tips. The localized field enhancement increases with a decrease in the emitter radius, resulting in a lower tunneling barrier for electrons to escape to vacuum. CNTs have been used as electron emitters since 1995 and exhibit low turn-in fields with high current density. The CNTs synthesized from the porous anodic Al—Fe—Al structure would, therefore, be useful for field emission because of their vertical orientation within the template and their small diameters. As discussed, the CNTs synthesized using the porous anodic Al—Fe—Al template have selectivity towards SWNTs and DWNTs having diameters in the range of 1-2 nm. Vertical and small diameter emitter have a large field-enhancement factor, acting to lower the emission potential barrier.

The in situ field emission of electrons from CNTs grown within the porous anodic Al—Fe—Al template was examined, with results displayed in FIG. 7.1. The film structure prior to anodization was 50/150/20/0.8/500 nm (Ti/SiO$_x$/Al/Fe/Al), chosen to place the Fe catalyst layer near the bottom Ti layer. The film was anodized with a potential of 40 V in 0.3 M oxalic acid and was subjected to a 20 minute 500° C. pre-anodization thermal diffusion step. Electron emission was performed at high vacuum and utilized a spherical anode with a 5 mm diameter. The data were obtained from 8 sequential emission experiments.

Emission data, shown in 7.1 was unstable between data points 5 and 6, denoted by a sharp decrease in current, likely due to poor CNT adhesion to the template or current-induced burnout. No metal was electrodeposited into the pores prior to emission. Electrons, therefore, may have had to overcome a tunneling barrier from the back Ti layer to the CNT initiation layer. Alternatively, the CNTs may have originated in an area of high Ti concentration due to the thermal diffusion step, as Ti and TiO$_2$ are electrically conductive. The low turn on voltage of 2 V/micron of data points 1-5 suggests that the CNTs have a high field enhancement factor. Because of the current instabilities and because of the uncertainty of actual CNT emission area, accurately determining emission current density is difficult; however the tested sample had an area of 45 mm$^2$, suggesting an apparent current density of 0.001 A/cm$^2$.

The two-terminal device structure may be considered quasi-vertical due to the length of CNTs growing horizontally along the top film surface. Incorporating a processing scheme utilizing spin on glass (SOG) deposition into the pores for mechanical stability followed by mechanical polishing of the top surface (including CNTs and Pd nanoparticles), a vertical two-terminal device structure may be realized after an additional electrodeposition step. Alternatively, some embodiments of the present invention utilize a focused ion beam to "mill" the top potion of the pore chamber along with the excess length of CNT. Another suitable technique is to etch the CNTs using oxygen plasma.

Because the top portions of CNTs would be sheared during the polishing step, the remaining CNT tips would be open-ended. Hence, because the main mechanism for Pd deposition on the SWNTs and DWNTs is driven by the presence of wall defects, further Pd electrodeposition should lead to Pd deposition on the CNT tips, creating a top contact. In conjunction with the Pd nanowire contacts already established prior to SOG deposition and subsequent polishing, contact metallization of a vertical SWNT channel would be complete.

The complexity of quasi-vertical two-terminal CNT devices has been further extended by the addition of photolithographic patterning of SiO$_2$/Ti/Al/Fe/Al film stacks onto thermally oxidized Si wafers. CNTs synthesized from the anodized film stack and originating near the edge of the defined anodic Al—Fe—Al film sometimes obtained sufficient length to extend onto the oxidized Si, as seen in FIG. 7.2(a). Electrode-position of Pd resulted in the formation of Pd nanowires in the pore bottoms and Pd nanoparticles on the portion of CNTs extending beyond the pores. As expected, Pd nanoparticles were observed on many CNTs that extended onto the oxidized Si, indicating that these CNTs were electrically contacted to the Ti layer beneath the anodized film. Finally, lithographically-defined Au electrical contacts were deposited on the oxidized Si near the anodized film edge and on top of Pd-decorated CNTs, as seen in FIG. 7.2(b). Additional functionalization of the patterned quasi-vertical two-terminal device could include channeled devices for sensor applications, and the structure could be adapted to include a gate for three-terminal devices.

Some embodiments of the present invention contemplate the creation of vertically oriented SWNT or DWNT field effect transistors (FETs) using the porous anodic Al—Fe—Al template. The CNT synthesis and in situ establishment of bottom contacts via Pd electrodeposition can form one basis of such a device. Unlike horizontally oriented CNT FETs, the vertical orientation of SWNTs and DWNTs within the relatively large template pores may assist in the formation of a surround-style gate that uniformly coats the CNT channel. The in situ coating of CNTs grown from the templated structure with alumina using atomic layer deposition (ALD) currently being explored. The use of ALD deposition is advantageous, as it allows for subsequent deposition of atomic layers of dielectric material. The use of a 8 nm ALD deposited HfO$_2$ top gate dielectric to a horizontally defined CNT FET has been reported for high-quality gate formation. Vertical isolation of the top and bottom (source and drain) contacts from the gate dielectric is important for proper device operation, although application of the gate to a majority of the CNT channel as advantageous.

While the inventions have been illustrated and described in detail in the drawings and foregoing description, the same is to be considered as illustrative and not restrictive in character, it being understood that the preferred embodiment has been shown and described and that changes and modifications that come within the spirit of the invention are desired to be protected.

What is claimed is:

1. A method of metallizing an array of carbon nanotubes, comprising:
    fabricating a template including a base conducting layer,
        a first layer of a material on top of the conductive layer, a second layer of catalytic material on top of the first layer, and a third layer of the material on top of the second layer;

forming a plurality of pores in the first, second, and third layers;

synthesizing at least one carbon nanotube from the catalytic layer in each of a plurality of pores;

placing the porous template in a solution containing metallic ions after said synthesizing; and electrodepositing a quantity of metal in each of the plurality of pores sufficient to establish electrical contact from the nanotube to the conductive material.

2. The method of claim 1 wherein the template includes alumina, and which further comprises removing a quantity of alumina from the bottom of a pore prior to said electrodepositing.

3. The method of claim 2 wherein said removing is by exposure to a plasma with a reducing agent, by reverse anodic anodization, or by ion milling.

4. A method of metallizing an array of carbon nanotubes, comprising:

fabricating a template of first and second layers of a material separated by a catalytic layer, at least a portion of one outer surface of a layer of the material having an electrically conductive material deposited thereon;

forming a plurality of pores in the template;

removing a portion of the material in the bottom of a pore;

synthesizing at least one carbon nanotube from the catalytic layer in the pore;

placing the porous template in a solution containing metallic ions after said synthesizing; and electrodepositing a quantity of the metal in the pore.

5. The method of claim 4 wherein the template has an external surface, and which further comprises removing a portion of the nanotube extending beyond the external surface.

6. The method of claim 4 wherein said fabricating includes a third layer of aluminum separated from the second layer of aluminum by a second catalytic layer.

7. The method of claim 6 which further comprises synthesizing a second carbon nanotube in the pore from the second catalytic layer.

8. The method of claim 1 wherein the template has an external surface, and which further comprises removing a portion of the nanotube extending beyond the external surface.

9. The method of claim 1 wherein said fabricating includes a fourth layer of the material separated from the third layer of the material by a fifth layer of catalytic material.

10. The method of claim 9 which further comprises synthesizing a second carbon nanotube in the pore from the fifth catalytic layer.

11. The method of claim 1 wherein the carbon nanotube is a single walled carbon nanotube.

12. The method of claim 4 wherein the carbon nanotube is a single walled carbon nanotube.

13. The method of claim 4 wherein said forming is by anodizing.

14. The method of claim 4 wherein the one carbon nanotube is the only carbon nanotube in the pore.

15. The method of 1 wherein the one carbon nanotube is the only carbon nanotube in the pore.

* * * * *